United States Patent [19]

Twibell et al.

[11] 4,090,239

[45] May 16, 1978

[54] INTERVAL TIMER FOR USE IN AN INPUT/OUTPUT SYSTEM

[75] Inventors: Jerome J. Twibell; Victor Michael Griswold, both of Phoenix; Jaime Calle, Glendale, all of Ariz.

[73] Assignee: Honeywell Information Systems Inc., Waltham, Mass.

[21] Appl. No.: 755,907

[22] Filed: Dec. 30, 1976

[51] Int. Cl.$^2$ ............................................. G06F 9/18
[52] U.S. Cl. ................................................. 364/200
[58] Field of Search ............................... 364/200 MS

[56] References Cited

U.S. PATENT DOCUMENTS

| | | | |
|---|---|---|---|
| 3,333,252 | 7/1967 | Shimabukuro | 364/200 |
| 3,568,157 | 3/1971 | Downing et al. | 364/200 |
| 3,599,162 | 8/1971 | Byrns et al. | 364/200 |
| 3,831,151 | 8/1974 | Jones, Jr. et al. | 364/200 |
| 3,964,054 | 6/1976 | Annumziata et al. | 364/200 |
| 3,988,719 | 10/1976 | Whitby et al. | 364/200 |

*Primary Examiner*—Harvey E. Springborn
*Attorney, Agent, or Firm*—Faith F. Driscoll; Nicholas Prasinos; Ronald T. Reiling

[57] ABSTRACT

An input/output system includes a plurality of modules and a system interface unit having a plurality of ports, each of which connects to a different one of the modules. The plurality of modules includes at least one processor and one memory module. The system interface unit includes a timer unit and a priority network for processing processor interrupt requests on a priority basis. The priority network connects to a register for storing coded priority level signals to be assigned to the different types of interrupt requests. The register is conditioned to store a low priority level for timer interrupts. The timer unit includes a preset register, an interval counter and a rollover counter. At the completion of each time interval, the interval counter is loaded automatically from the preset register and counting is continued. Simultaneously, the interval counter conditions the rollover counter to store a count registering the total number of completed intervals counted. The processor responds to a timer interrupt request by a special command which can only selectively clear the rollover counter to ZEROS when the interval counter is not in the process of completing another interval.

31 Claims, 25 Drawing Figures

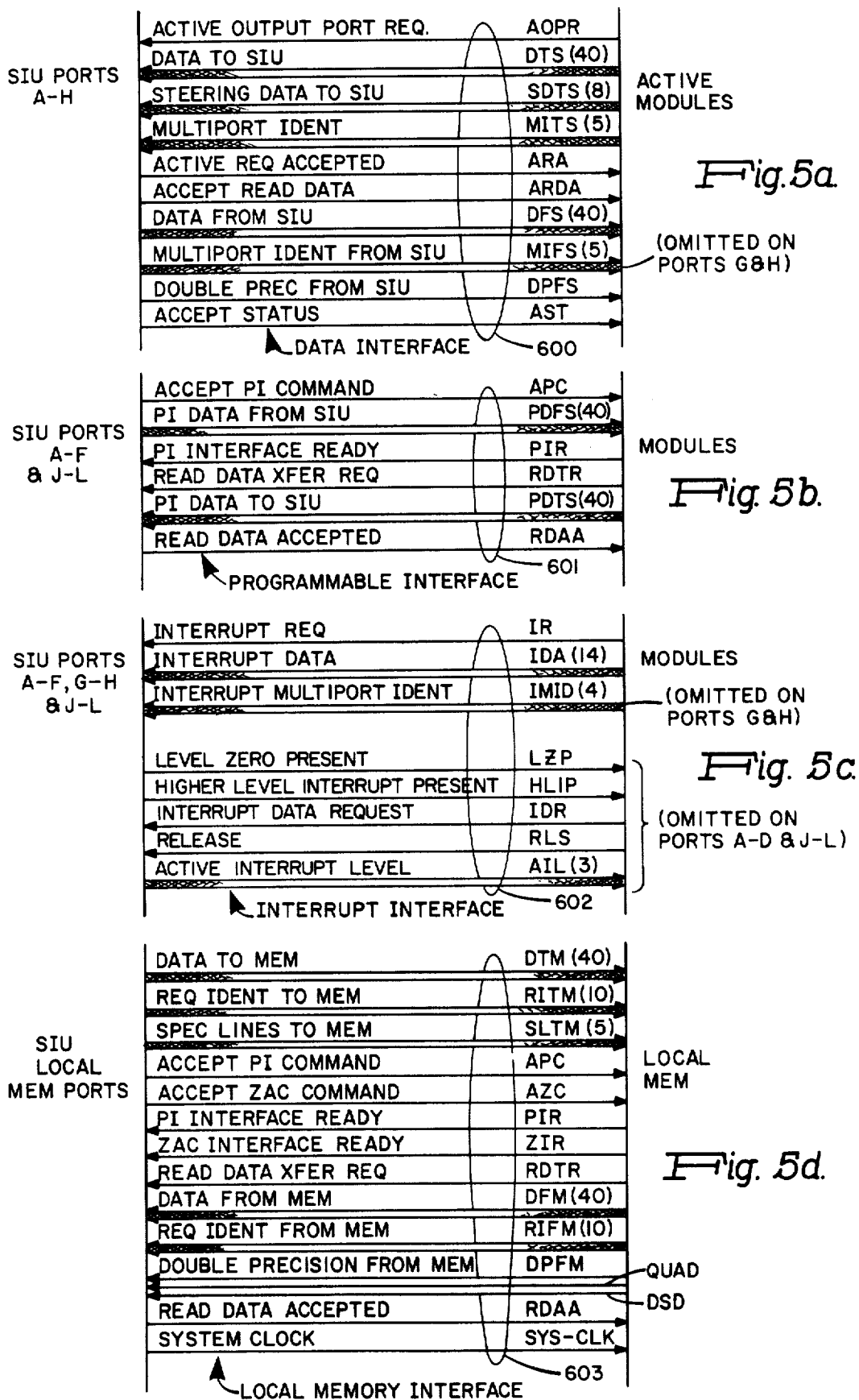

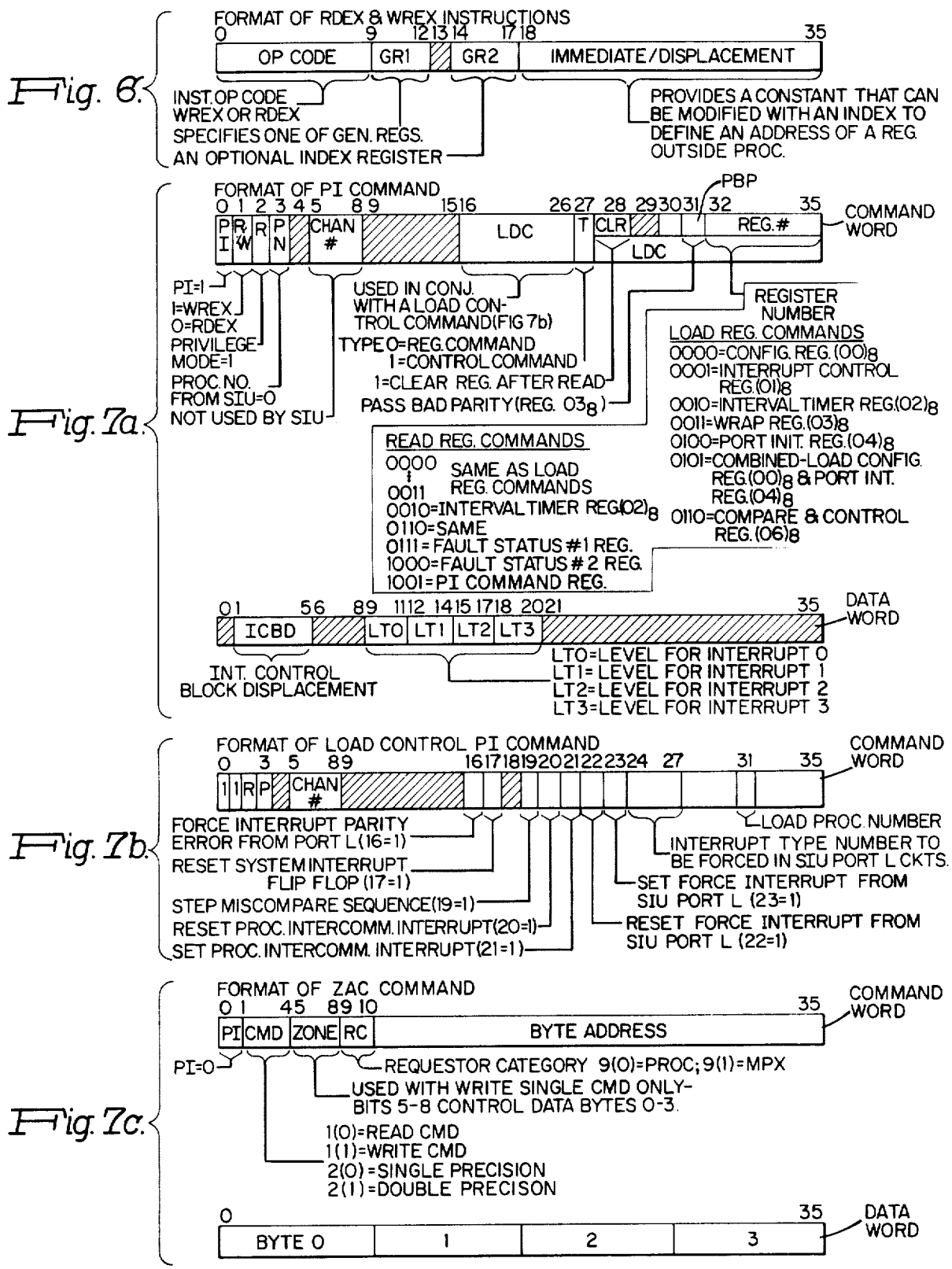

Fig. 8a.

```
INTERRUPT CONTROL REGISTER (01)₈ FORMAT (LOAD COMMAND)
 0 1    5 6    8 9   11 12  14 15  17 18  20 21              35
┌─┬──────┬─────┬─────┬─────┬─────┬─────┬───────────────────────┐
│R│ ICBD │ RFU │ LT0 │ LT1 │ LT2 │ LT3 │         RFU           │
│F│      │     │     │     │     │     │                       │
│U│      │     │     │     │     │     │                       │
└─┴──────┴─────┴─────┴─────┴─────┴─────┴───────────────────────┘
```

BITS......0 = RESERVED FOR FUTURE USE
 1-5 = INTERRUPT CONTROL BLOCK DISPLACEMENT
 6-8 = RESERVED FOR FUTURE USE
 9-11 = INTERRUPT LEVEL TYPE 0
 12-14 = INTERRUPT LEVEL TYPE 1
 15-17 = INTERRUPT LEVEL TYPE 2
 18-20 = INTERRUPT LEVEL TYPE 3
 21-35 = RESERVED FOR FUTURE USE

Fig. 8b.

```
INTERVAL TIMER PRESET REGISTER (02)₈ FORMAT (LOAD COMMAND)
0                                         22 23 24          35
┌──────────────────────────────────────────┬──┬──────────────┐
│                  RFU                     │IE│    ITPR      │
└──────────────────────────────────────────┴──┴──────────────┘
```

BITS...0-22 = RESERVED FOR FUTURE USE
 23 = INTERVAL TIMER INTERRUPT ENABLE (1=ENABLE, 0=DISABLE)
 24-35 = INTERVAL TIMER PRESET REGISTER COUNT WHEREIN
  BIT 35 IS THE LEAST SIGNIFICANT BIT

Fig. 8c.

```
REGISTER (02) FORMAT FOR READ COMMAND
0   2 3 4                   15 16    19 20              35
┌────┬─┬────────────────────┬────────┬───────────────────┐
│RFU │IE│      ITPR         │   TR   │        IT         │
└────┴─┴────────────────────┴────────┴───────────────────┘
```

BITS....0-2 = RESERVED FOR FUTURE USE
 3 = INTERVAL TIMER INTERRUPT ENABLE (BIT 3=1)
 4-15 = INTERVAL TIMER PRESET REGISTER
 16-19 INTERVAL TIMER ROLLOVER BITS
 20-35 = INTERVAL TIMER WHEREIN BIT 35 IS THE LEAST SIGNIFICANT BIT.
THE READ AND CLEAR BIT WHEN SET, THE TR FIELD AND INTERRUPT
REQUEST FLIP-FLOP ARE PRESET AS FOLLOWS:

|         | TR   | INTERRUPT REQUEST F/F |
|---------|------|----------------------|
| IT = ZERO | 0001 | SET |
| IT ≠ ZERO | 0000 | RESET |

THE IT FIELD IS NOT MODIFIED BY THE READ AND CLEAR BIT WHEN SET.
THE INTERRUPT ENABLE BIT ENABLES THE OUTPUT OF THE INTERRUPT
REQUEST FLIP-FLOP.

Fig. 11.

```
 0 1    3 4            8 9      11
┌─┬──────┬──────────────┬─────────┐
│P│LEVEL │     ICB      │INT. TYPE│
│N│ NO.  │ DISPLACEMENT │APPENDAGE│
└─┴──────┴──────────────┴─────────┘
      INT. CONTROL
      BLOCK NO.
```

100 = PROC. ERROR
101 MISCOMPARE - ERROR DELETED
110 = MISCOMPARE - NO ERROR
111 = SIU INTERNAL ERROR
000 = SYSTEM INT.
001 = INTERVAL TIMER EXHAUST
010 = IOPP INTERCOMM.
011 = MEMORY ACCESS PANEL ENTRY

Fig. 12.

```
 0         4 5 6 7
┌─┬─────────┬─┬─┬─┐
│P│PORT NO. │S│R│Po│
│I│         │D│W│ │
└─┴─────────┴─┴─┴─┘
 PI=1
```

PARITY BIT GEN. BY REQUESTOR
DIRECTION OF TRANSFER
 READ = 0
 WRITE = 1
ONE WORD TRANSFER = 0
TWO WORD TRANSFER = 1
SIU PORT TO WHICH PI COMMAND IS
DIRECTED (PSR BITS 0-3)

INTERVAL TIMER FOR USE IN AN INPUT/OUTPUT SYSTEM

RELATED PATENT APPLICATIONS

1. "Input/Output Processing System Utilizing Locked Processors" invented by John M. Woods, Marion G. Porter, Donald V. Mills, Edward F. Weller, III, Garvin W. Patterson and Earnest M. Monahan, Ser. No. 741,632, filed on Nov. 15, 1976 and assigned to the same assignee as named herein.

BACKGROUND OF THE INVENTION

1. Field of Use

The present invention relates to data processing systems and more particularly to timing apparatus for measuring the required time intervals for such data processing systems.

2. Prior Art

In many sophisticated data processing systems, it is important to be able to control efficiently the time out of events to ensure proper utilization of system's resources (e.g. processors, memory space and input/output devices by being able to detect the completion of such events). For example, the central processor normally employs an interval timer which enables it to keep track of the time of day and to interrupt periodically as required. Thus, this allows for the performance of functions such as the time out of events (watchdog timer operations), the polling of communication networks on a regular basis and time of day recording.

In many prior art systems, it is encumbent upon the processor to respond to a time out condition within a minimum period of time after receipt of a timer interrupt. The reason is that waiting can result in the read out of inaccurate time information. Accordingly, the processor is required to interrupt normal processing to respond immediately to each timer produced interrupt. In addition to increasing processing overhead, this can result in other deficiencies particularly where the processor is performing input/output operations.

Accordingly, it is a primary object of the present invention to provide a timer which has high resolution.

It is a more specific object of the present invention to provide a timer which requires low overhead in servicing without sacrificing accuracy in the time dependent information it provides.

It is still a further object of the present invention to provide a timer arrangement which facilitates the performance of functions relating to input/output operations.

SUMMARY OF THE INVENTION

The above and other objects are achieved according to the teachings of the present invention which comprise a preferred embodiment of a timer unit included within an input/output system. A preferred embodiment of the input/output system includes a plurality of modules and a system interface unit having a plurality of ports, each of which connects to a different one of the modules. The plurality of modules includes at least one processor and one memory module.

The timer unit is included within the system interface unit which further includes a priority network for processing processor interrupt requests on a priority basis. The priority network connects to a register which stores a number of coded priority level signals specifying the priorities assigned to the different types of interrupt requests. In accordance with the present invention, the register is conditioned to store signals specifying a low priority for timer type interrupts.

The preferred embodiment of the timer unit includes a preset register for storing a processor established count for defining a time interval, an interval counter connected to the preset register for receiving a count therefrom and a rollover counter connected to the interval counter. The timer unit upon detecting each completion of the time interval specified by the preset register generates an interrupt request to the priority network. At each such completion, the interval counter is loaded automatically from the preset register and counting continues. Simultaneously, the interval counter generates a signal which conditions the rollover counter to store a count registering the total number of completed intervals counted.

When the timer interrupt request is answered, the processor reads the value stored by the interval counter by directing a special command to the system interface unit. The command is coded to selectively clear only the rollover counter to ZEROS when the interval counter is not in the process of completing another interval. That is, when the interval counter is not in the process of incrementing the rollover counter, by one, the rollover counter is reset to ZEROS. However, when the interval counter is in the process of incrementing the rollover counter, the counter is preset to a count of ONE and the interrupt request remains active or set. Since the interval counter cannot be altered by the processor, its accuracy is ensured (i.e., no variation can be caused by the processor changing counts).

By having the rollover counter maintain a count of complete timer intervals which occur before the processor answers a timer interrupt request, it is possible to assign a priority level to timer interrupts which is low as compared to the priority levels assigned to other types of interrupt requests. Hence, the overhead in processing such interrupt requests is reduced.

At the same time the accuracy of the time intervals is retained by using the preset register to load automatically the interval counter with an appropriate count. This operation eliminates any loss of time that might result in the time lapse from the timer rollover and the processor updating the counter in the conventional manner. This also reduces overhead by eliminating the need for the processor intervention during the operation of the timer as an interval timer (i.e., for establishing new time intervals).

Each time the processor answers a timer interrupt request, it normally uses the time out value to update a number of values stored in a number of watchdog timer tables. Additionally, the timer, in accordance with the present invention, can be used by the processor in the performance of other functions such as time of day recording and recording the time at which a certain event took place. In such instances, the processor would direct another type of command to the system interface unit. This command is coded so as to cause a read out of signals representative of the values of the interval and rollover counters to the processor. The processor, in turn, uses such values for calculating parts of time intervals for adding to a count stored in the memory module. The result would be used in establishing the time of day or the time occurrence of an event. Thus, by utilizing the timer of the preferred embodiment, a processor is able to perform the various time functions efficiently and expeditiously.

The novel features which are believed to be characteristic of the invention both as to its organization and method of operation, together with further objects and advantages will be better understood from the following description when considered in connection with the accompanying drawings. It is to be expressly understood, however, that each of the drawings is given for the purpose of illustration and description only and is not intended as a definition of the limits of the present invention.

BRIEF DESCRIPTION OF THE DRAWINGS

FIG. 4b shows in greater detail certain portions of FIG. 4a.

FIGS. 5a through 5d show the various interfaces of FIG. 1.

FIG. 6 illustrates the format of WREX and RDEX program instructions.

FIGS. 7a through 7c illustrate the format of different commands used by the processor pair 200-0 of FIG. 1.

FIGS. 8a through 8c illustrate the formats of the contents of different registers included in the system interface unit 100 of FIG. 1.

FIG. 11 illustrates the format of an interrupt data word.

FIG. 12 illustrates the format of one type of steering data.

DESCRIPTION OF THE PREFERRED EMBODIMENT

General Description

Figure 1:
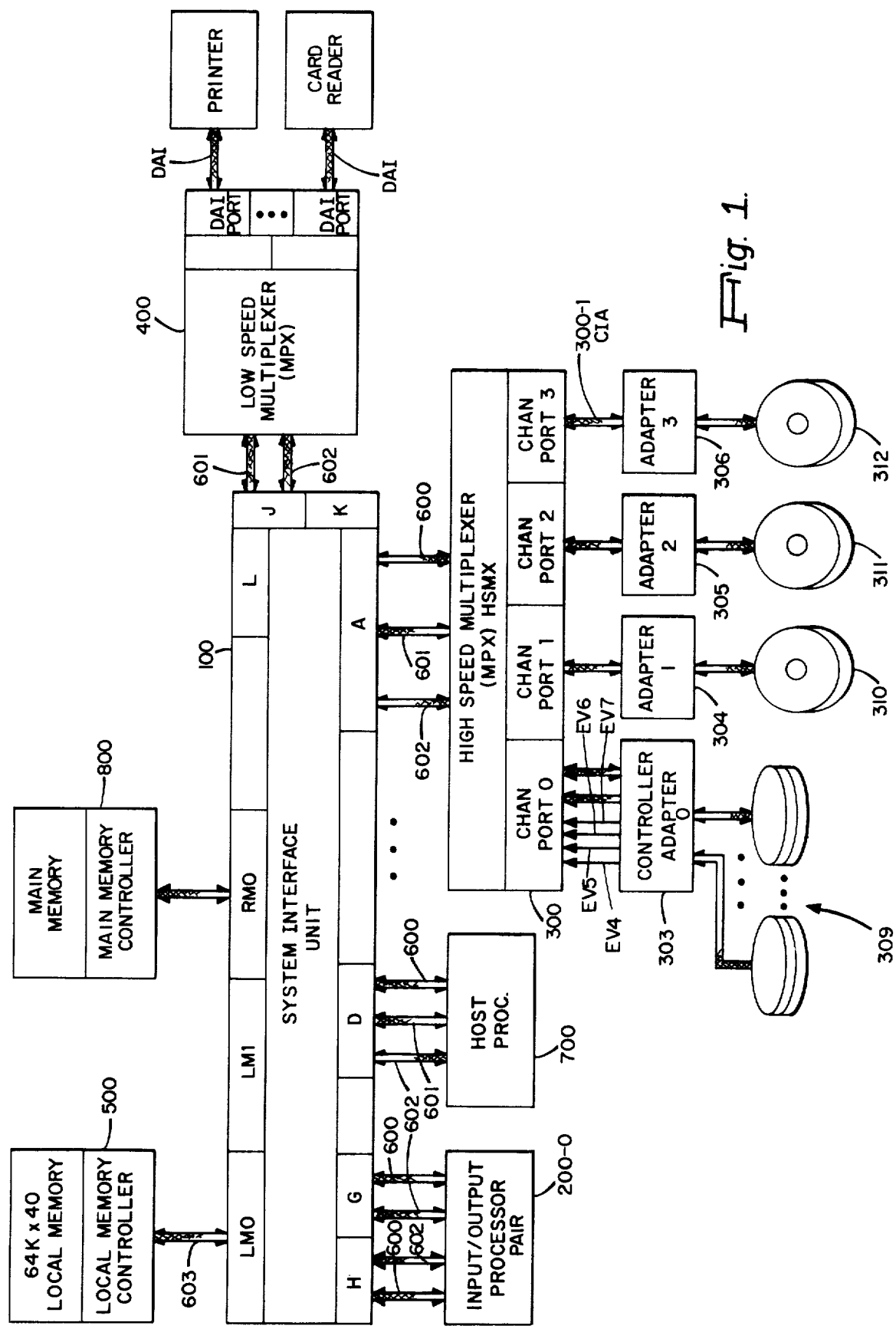
FIG. 1 illustrates in block diagram form an input/output system employing the principles of the present invention.

As seen from FIG. 1, the system which incorporates the principles of the present invention includes an input/output processor (IOPP) pair 200-0, a system interface unit (SIU) 100, a high speed multiplexer (HSMX) 300, a low speed multiplexer (LSMX) 400, a host processor 700, a local memory module 500, and a main memory module 800. Different ones of these modules connect to one of a number of ports of the system interface unit 100 through a plurality of lines of different ones of different types of interfaces 600 through 603. More specifically, the two input/output processors of logical pair 200-0, the host processor 700, and high speed multiplexer 300 connect to ports G, H, D, and A, respectively, while the low speed multiplexer 400, memory modules 500 and 800 connect to ports J, LMO, and RMO, respectively.

The input/output system of FIG. 1 can be viewed as including a number of "active modules," "passive modules," and "memory modules." The IOP processor pair 200-0, host processor 700, and high speed multiplexer 300 serve as active modules in that each has the ability to issue memory commands. The active modules normally connect to ports A through H. A plurality of passive modules are connected to three ports J, K, and L. These modules correspond to the low speed multiplexer 400 and the system interface unit 100 and are units capable of interpreting and executing commands applied to the lines of interface 601 as described herein. The last group of modules constitutes local memory modules and remote memory modules (not shown) such as those of the main system (not shown) which are capable of executing two different types of commands applied to the lines of interface 603.

The input/output system of FIG. 1 normally functions as an input/output subsystem responsive to input/output instructions issued by host processor 700 which normally connects to port D via the interface 600, 601, and 602 which correspond to a data interface, a programmable interface, and an interrupt interface, respectively, described in greater detail herein. Ports F and E include interfaces for enabling connection of either multiplexer or processor modules of FIG. 1.

For the purpose of the present invention, processor 700 is conventional in design and may take the form of those units described in U.S. Pat. No. 3,413,613. In the preferred embodiment, the input/output processor 200 initiatess and terminates channel programs required for the execution of input/output instructions, processes interrupt requests received from the system interface unit 100 and directly controls unit record peripheral devices coupled to low speed multiplexer 400. The processor pair 200-0 connects to ports G and H via the data interface 600 and interrupt interface 602.

The low speed multiplexer 400 which for the purposes of the present invention can be considered conventional in design, provides for attachment of low speed peripheral devices via peripheral adapters, each of which couples to the lines of a device adapter interface (DAI). The interface and adapter may take the form of those units described in U.S. Pat. No. 3,742,457, which is assigned to the assignee of the present invention. The low speed devices include card readers, card punches, printers, and consoles. As seen from FIG. 1, the multiplexer 400 connects to port J via the programmable interface 601.

The high speed multiplexer 300 directly controls transfers between the groups of disk devices and tape devices 309 through 312 which connect to different ones of the channel adapters 302 to 305. Each of the channel controller adapters 303 through 306 which connects to a maximum of 16 devices, in turn, connects to a different one of the ports or channels 0 through 3 via the interface lines of a channel adapter interface (CAI) 301-1. The high speed multiplexer 300 connects to port A corresponding to a data interface 600, a programmable interface 601, and an interrupt interface 602.

For the purposes of the present invention, each of the channel controller adapters 302 through 305 may be considered conventional in design and take the form of controller adapters described in the aforementioned U.S. Pat. No. 3,742,457.

As mentioned previously, each of the modules connects to different ports of the system interface unit 100. The unit 100 controls the connection of the different modules to each other via transfer paths enabling the transfer of data and control information between pairs of modules. For the purposes of the present invention, the system interface unit 100 can be viewed as a switching network enabling each of the "active" modules to transfer data to and from local memory module 500 when the requesting module has the highest priority and is granted the next available memory cycle. That is, as explained herein, the unit 100 includes priority logic circuits which determine the relative priority of requests from each of the active modules and grants the next available memory cycle to the highest priority request received.

Additionally, the unit 100 includes interrupt priority logic circuits which determine the relative priority of interrupt requests received from each of the modules and selects the highest priority request received and passes the request to processor 200 via a switching network as explained herein.

THE PORT INTERFACES

Before describing in greater detail different ones of the modules of FIG. 1, each of the interfaces 600 through 603 referred to previously will now be described with reference to FIGS. 5a through 5d.

Referring first to FIG. 5a, it is seen that this figure discloses the lines which constitute the data interface which is one of the interfaces which provides for exchange of information between an active module and the system interface unit 100. Exchange is accomplished by controlling the logical states of various signal lines in accordance with pre-established rules implemented through a sequence of signals termed a "dialog".

As seen from FIG. 5a, the interface includes an active output port request line (AOPR), a plurality of data to SIU lines (DTS 00-DTS 35, P0-P3), a plurality of steering data to SIU lines (SDTS 0-6, P), a plurality of multiport identified to SIU lines (MITS 0-3, P), an active request accepted line (ARA), an accept read data line (ARDA), a plurality of data from SIU bus lines (DFS 00-35, P0-P3), a plurality of multiport identifier from SIU lines (MIFS 0-3, P), a double precision from SIU line (DPFS), and an accept status line (AST). The description of the interface lines is given in greater detail in the section to follow.

| DATA INTERFACE LINES | |
|---|---|
| Designation | Description |
| AOPR | The active output port request line is a unidirectional line which extends from each of the active modules to the SIU 100. When set, this line signals the SIU that the module requests a transfer path over which a command or data is to be transferred. |
| DTS 00-35, P0-P3 | The data to SIU lines are a four byte wide unidirectional path (four 10 bit bytes) that extend between each of the active modules and the SIU and are used for transferring commands or data from each active module to the SIU 100. |
| SDTS 0-6, P | The steering data to SIU lines extend from each active module to the SIU 100. These lines are used to apply steering control information to the SIU 100 when the line AOPR is set. Steering control information consists of seven bits and a parity bit which are coded as follows:<br>a) The state of bit 0 - The type of command applied to the DTS lines (whether the command is a programmable interface command or a memory command).<br>b) Bits 1-4 are coded to indicate which one of the modules is to receive and interpret the command (commands are interpreted only by memory modules and programmable interface commands shall be interpreted by all modules except input/output processors 200-0).<br>c) The state of bit 5 indicates whether one or two words of the command information is to be transferred |

-continued

| DATA INTERFACE LINES | |
|---|---|
| Designation | Description |
| | between the requesting active module and the designated receiving module (one word specifies a single precision transfer and two words specifies a double precision transfer).<br>d) The state of bit 6 indicates the direction of transfer between the requesting module and the designated receiver module.<br>e) Bit P is a parity bit generated by the requesting active module which is checked by apparatus included within the SIU 100. |
| MITS 0-3, P | The four multiport identifier to SIU lines extend from the active module to the SIU 100. These lines are coded to indicate which subchannel or port within an active module caused the setting of line AOPR. |
| ARA | The active request accepted line extends from the SIU 100 to each of the active modules. This line is set to indicate that the designated receiving module has accepted the active module's request which allows the module to remove the requested information from the data interface lines. |
| ARDA | The accept read data line extends from the SIU to each of the active modules. This line is set by SIU 100 to indicate the active module that it is to accept the previously requested data from a designated module. |
| DFS 00-35, P0-P3 | The data from SIU lines are another set of data path lines which are a four byte wide unidirectional path (four 10 bit types) which extends from the SIU to each active module. This set of lines is used by the SIU 100 to convey read type data to a designated one of the active modules. |
| MIFS 0-3, P | The four multiport identifier from SIU lines plus odd parity line extend from the SIU 100 to each of the active modules. These lines are coded to indicate which port or subchannel on the active module is to accept the data of a previous read operation from the SIU 100. |
| DPFS | The double precision from SIU line extends from the SIU to each of the active modules. The state of this line indicates whether one or two words of read data are to be accepted by the active module to complete a transfer (read command). |
| AST | The accept status line extends from the SIU 100 to each active module. The state of this line which is mutually exclusive of line ARDA signals the active module that it should accept status information applied to the DFS lines. |

The lines of the programmable interface 601 shown in FIG. 5b provide for transfer of command information from an active module and a designated module. The transfer is accomplished by controlling the logic of states of the various signal lines in accordance with pre-established rules implemented through a sequence of signals termed "dialog." The programmable interface includes an accept programmable interface command line (APC), a plurality of programmable interface data from SIU lines (PDFS 00-35, P0-P3), a programmable interface ready line (PIR), a read data transfer request line (RDTR), a plurality of programmable interface data to SIU lines (PDTS 00-35, P0-P3) and a read data accepted line (RDAA). The description of the interface lines are given in greater detail herein.

| PROGRAMMABLE INTERFACE LINES | |
|---|---|
| Designation | Description |
| APC | The accept programmable interface command line extends from the SIU 100 to each receiving module. When set, this line signals the module that command information has been applied to the PDFS lines of the interface by the SIU and is to be accepted by the module. |

-continued

| PROGRAMMABLE INTERFACE LINES | |
|---|---|
| Designation | Description |
| PDFS 00-35, P0-P3 | The programmable interface data from SIU lines are a four byte wide unidirectional path (four 10 bit bytes) that extends from the SIU 100 to each module. These lines apply programmable interface information from the system interface unit to a designated receiving module. |
| PIR | The programmable interface ready line extends from each module to the SIU. When high, this line indicates that the module is ready to accept a command to be applied to line PDFS. |
| PDTS 00-35, P0-P3 | The programmable interface data to the SIU lines are a four byte wide unidirectional path (four 10 bit bytes) that extend from each module to the SIU 100. These lines are used to transfer programmable interface information to the SIU. |
| RDTR | The read data transfer request line extends from each module connected to the programmable interface to the SIU 100. When high, this line indicates that the previously requested read data is available for transfer to a module and has been applied to the lines PDTS by the module. |
| RDAA | The read data accepted line extends from the SIU 100 to each module. When high, the line indicates to the module that the data applied to the lines PDTS has been accepted and that the module may remove the information from these lines. |

A further interface is the interrupt interface 602 of FIG. 5c which provides for interrupt processing by the input/output processor pairs 200-0 and 200-1. That is, the interface enables the transfer of interrupt information by an active module to the SIU 100 as well as the transfer of interrupt information by the SIU 100 to the input/output processor 200 for processing. Similar to the other interfaces, the transfer of interrupt requests is accomplished by controlling the logical states of the various signal lines in accordance with pre-established rules implemented through a sequence of signals termed "dialog."

The interface includes an interrupt request line (IR), a plurality of interrupt data lines (IDA 00-11, P0-P1), and a plurality of interrupt multiport identifier lines (IMID 00-03) for modules connected to ports A through L. For modules connected to ports G and H, the interrupt interface further includes a level zero present line (LZP), a higher level interrupt present line (HLIP), an interrupt data request line (IDR), a release line (RLS), and a plurality of active interrupt level lines (AIL0-2). As seen from FIG. 5c, the interrupt interface ports G and H do not include an interrupt multiport identifier line. The description of the interrupt lines is given in greater detail herein.

| INTERRUPT INTERACE LINES | |
|---|---|
| Designation | Description |
| IR | The interrupt request line extends from each module to the SIU 100. When set, this line indicates to the SIU that it requires service. |
| IDA 0-3, P0 IDA 4-11, P1 | The interrupt data lines extend from an active module to the SIU 100. These lines are coded to contain control information required to be transferred to the input/output processor. These bits are coded as follows:<br>a) The state of bit 0 specifies to the SIU 100 which of the two processors (i.e., processor number) is to process the interrupt request.<br>b) Bits 1-3 are coded to indicate the priority or level number of the interrupt request to the SIU 100.<br>c) Bit P0 is a parity bit for bits 0-3.<br>d) Bits 4-8 are coded to provide a portion |

-continued

| INTERRUPT INTERACE LINES | |
|---|---|
| Designation | Description |
| | of an address required to be generated by an input/output processor for referencing the correct procedure for processing the interrupt (i.e., an interrupt control block number ICBN).<br>e) Bit P1 is a parity bit for bits 4-11. |
| IMID00-03 | The interrupt multiport identifier lines extend from each active module to the SIU 100. These lines are coded to identify which specific subchannel of the active module has requested interrupt service. |
| LZP | The level zero present line extents from the SIU 100 to the input/output processor. When set, this line indicates that there is a highest priority (level 0 interrupt) request being directed to a processor by the SIU 100. |
| HLIP | The higher level interrupt present line extends from the SIU to each input/output processor. When set, this line indicates that thee is an interrupt request having a higher level or priority than the procedure or process being executed by the processor. |
| IDR | The interrupt data request line extends from the input/output processor to the SIU 100. When set, this line indicates that interrupt data is to be sent to the processor on lines DFS by the SIU 100. |
| RLS | The release line extends from each input/output processor to the SIU 100. This line, when set, indicates that the processor has completed execution of the current procedure. |
| AIL 0-2 | The active interrupt level lines extend from the SIU to the input/output processor. These lines are coded to designate the interrupt level number of the procedure being executed by the processor. |

A further set of interface lines utilized by certain ones of the modules of FIG. 1 corresponds to the local memory interface lines of FIG. 5d. The local memory interface 603 provides for exchanging information between local memory 500 and the modules of the system. The exchange is accomplished by controlling logical states of the various signal interface lines in accordance with pre-established rules implemented through a sequence of signals termed a "dialog". The local memory interface includes a plurality of data to memory lines (DTM 00-35, P0-P3), a plurality of request identifier to memory lines (RITM 0-7, P0-P1), a plurality of specification lines to memory lines (SLTM 0-3, P), an accept PI command line (APC), an accept ZAC command line (AZC), a PI interface ready line (PIR), a ZAC interface ready line (ZIR), a read data transfer request line (RDTR), a plurality of data from memory lines (DFM 00-35, P0-P3), a plurality of request identifier from memory lines (RIFM 0-7, P0-P1), a double precision from memory line (DPFM), a QUAD line, a read data accepted line (RDAA) and a system clock line (SYS-CLK). A similar interface is used for connecting the main memory module 800 to the SIU 100.

Memory and programmable interface commands are transferred out of the same physical data lines of the interface. The interface does not include a set of lines for processing interrupt requests and therefore the modules connected to the local memory by the SIU 100 cannot directly cause a memory interrupt. The description of the local memory interface lines is given in greater detail herein.

| LOCAL MEMORY INTERFACE LINES | |
|---|---|
| Designation | Description |
| DTM 00-35, | The data path lines constitute a four byte |

-continued
LOCAL MEMORY INTERFACE LINES

| Designation | Description |
|---|---|
| P0-P3 | wide unidirectional path (36 information lines and four odd parity lines) that extends from the SIU 100 to the local memory 500. These lines are used to transfer memory or programmable interface commands to the local memory 500. |
| RITM 0-3 P0 | The requestor identifier to memory lines |
| RITM 4-7, P1 | constitutes two groups of four lines which extend from the SIU 100 to the local memory 500. These lines are coded to convey information to the local memory identifying the module which initiated the command and are used to return the data requested to the proper module. |
| SLTM 0-3, P | The specification lines to memory extend from the SIU 100 to the local memory 500 and include two port number selection lines, a read/write to memory line, a double precision to memory line and a parity line. The information signals applied to these lines are coded as follows. <br> a) Bits 0-1 are port number selection bits coded to specify which port or subchannel within the attached module is to receive or interpret the memory command sent to the module. <br> b) Bit 2 is a read/write to memory bit which is included in the steering control information received from the active module which is forwarded by the SIU to the local memory 500 when a new command is sent to the memory by the SIU 100. The state of this bit indicates the direction of data transfer. <br> c) Bit 3 is a double precision to memory bit coded to specify the amount of data to be transferred. It is also included in the steering control information provided by the active module which is forwarded to the local memory module 500 by the SIU 100 when a new command is sent to the memory module. |
| AZC | The accept ZAC command line extends from the SIU 100 to the local memory module 500. When set, this line signals the local memory module 500 to accept the ZAC command and control information applied to the other lines by the SIU 100. The setting of this interface line is mutually exclusive with the accept PI command interface line. |
| APC | The accept programmable interface command line, as described in connection with the programmable interface, extends from the SIU 100 to the local memory module 500. When set, this line indicates that the command information applied to the lines DTM is to be accepted by the local memory module 500. |
| PIR/ZIR | The programmable interface ready line/ZAC interface ready line extends from the local memory module 500 to the SIU 100. When set, each line signals the SIU 100 that the local memory module 500 is capable of accepting a programmable interface (PI)/memory (ZAC) command. |
| RDTR | The read data transfer request line extends from the local memory module 500 to the SIU 100. This line, when set, indicates that the read type data previously requested by a ZAC or PI command is available along with the necessary control information to be sent to the module requesting the data. |
| DFM 00-35, P0-P3 | The data from memory lines are a four byte wide unidirectional bus which extends from The local memory module 500 to the SIU 100. These lines are used to return read requested type data to an active module via the SIU 100. |
| RIFM 0-3, P0, RIFM 4-7, P1 | The two groups of requestor identifier from memory lines extend from the local memory module 500 to the SIU 100. These lines are coded for directing the read data from module 500 back to the requesting module. |
| DPFM and QUAD | The double precision from memory line and QUAD line extend from the local memory module 500 to the SIU 100. These lines are coded to indicate the number of words to be transferred via the SIU 100 to the requesting module during read data transfer request time interval. These lines are coded as follows |

QUAD DPFM

-continued
LOCAL MEMORY INTERFACE LINES

| Designation | Description | |
|---|---|---|
| | 0 0 | one word single precision |
| | 0 1 | two words, double precision |
| | 1 X | four words |
| | (don't care) | |
| DSD | The read data/status identifier line extends from the local memory module 500 to the SIU. The state of this line signals the SIU 100 whether the information applied to the lines DFM is read data or status information when line RDTR is set. When set, the line indicates status information of one or two words (QUAD=0) | |
| DSD | is being transferred. When reset to a binary ZERO, the line signals that up to four words of data are being transferred, the number being specified by the coding of lines QUAD and DPFM. | |
| RDAA | The read data accepted line, as mentioned in connection with the programmable interface, extends from the SIU 100 to the local memory module. When set, this line signals the memory module that the data applied on the interface lines by the local memory module has been accepted and that the local memory module may remove data from these lines. | |
| SYS-CLK | The system clock line is a line which extends from the SIU 100 to each module of the system. This line is connected to a clock source included within the input/output processor to synchronize the operations of each memory module from a common system clock source. | |

A last set of interface lines is shown in FIG. 5e. In accordance with the present invention, several of these lines signal certain conditions as for example error conditions and operational conditions. More importantly, these lines enable the SIU 100 to control the operation of the processor pair in accordance with the present invention.

As seen from FIG. 5e, the interface includes a parity error detected line (PED), a trouble line (TBL), a STOP line, an initialize line (INIT), and an operational in line (OPI).

DETAILED DESCRIPTION OF INPUT/OUTPUT PROCESSOR 200

Figure 2:
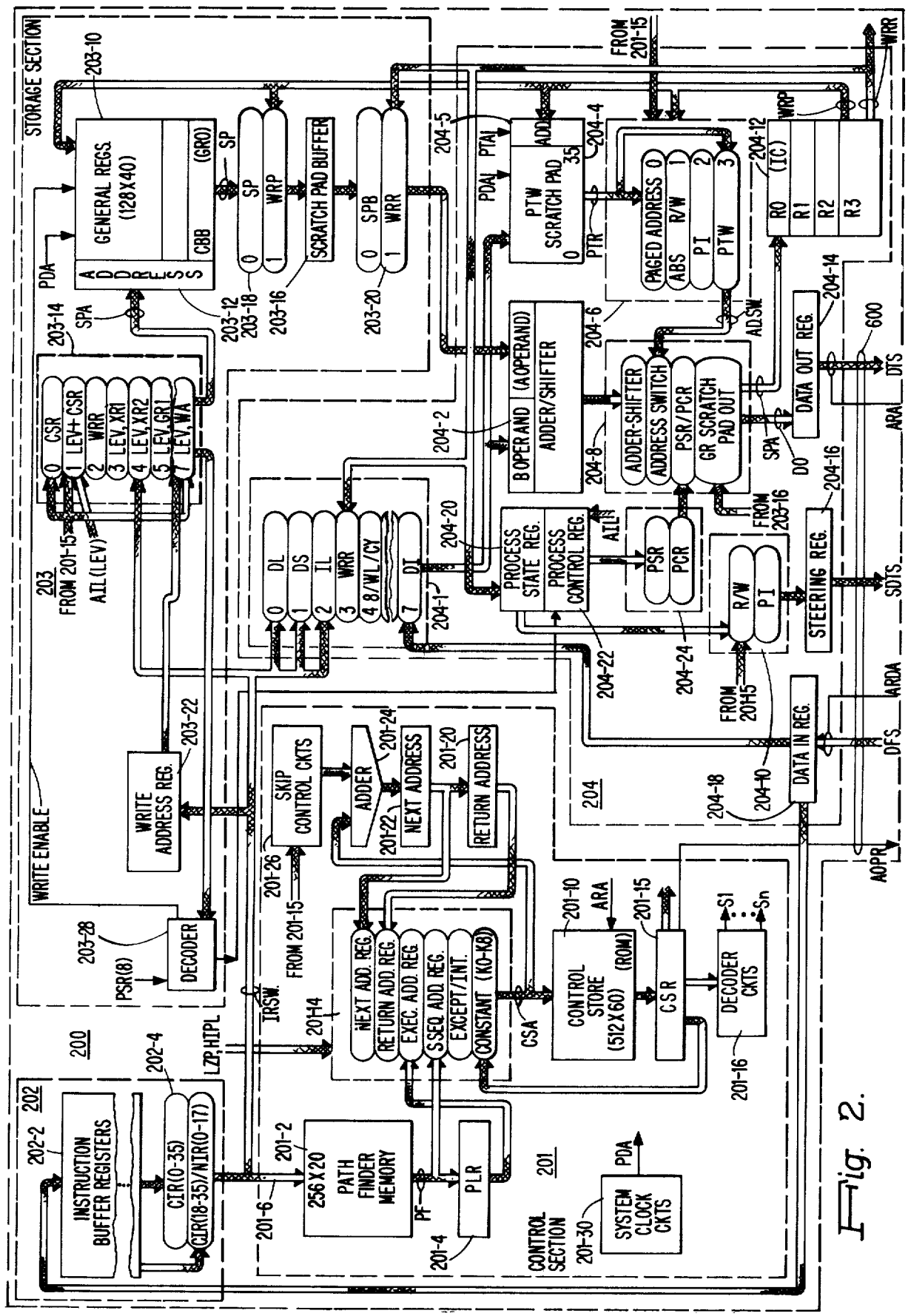
FIG. 2 shows in greater detail one of the processors of the processor pair 200-0 in FIG. 1.

Referring to FIG. 2, it is seen that the processor 200 comprises a microprogrammed control section 201 operative to generate control signals in response to microinstructions stored in a control store 201-10 for executing instructions, an instruction buffer section 202 for storing instructions fetched from the local memory module 500, a storage section 203 and a processing section 204 for performing arithmetic and logic operations under the control of microprograms stored in control store 201-10.

CONTROL STORE SECTION 201

Considering each section in greater detail, the control store 201-10 is constructed of fixed sections which use for example a read only memory (ROM). The store 201-10 is addressable via signals from any one of the eight address sources applied to a selector switch 201-14. The contents of the addressed locations are read out into an output register 201-15 and decoded by decoder circuits included within a block 201-16.

Additionally, as shown, signals from one of the fields of the microinstruction contents of register 201-15 are applied as an input to the switch 201-14 for selecting which one of the eight input sources is to apply an address to control store 201-10. The microinstructions read out to register 201-15 include address constants for branching the control store 201-10 to appropriate microprogram routines.

As seen from FIG. 2, the eight control store address sources include: interrupt/exception signals derived from signals applied by the system interface unit 100 and circuits included within processor 200; a next address register position which receives next address information stored in a register 201-22 via an adder circuit 201-24; a return address register position which receives the return address contents of a return register 201-20; an execution address register position which receives an address from a pathfinder memory 201-2 via memory output register 201-4; a sequence address register position which also receives an address from register 201-4; and a constant position which receives a constant value from the output register 201-15.

The appropriate next address is generated by adder circuit 201-24 which receives as one operand input, address signals from one of the sources selected by switch 201-14 and as the other operand input, signals from skip control circuits of a block 201-26. The skip control circuits are conditioned by constant signals stored in control store register 201-15 which in turn provide an appropriate value as one of the operand inputs to the adder 201-24. The resultant address generated by adder circuit 201-24 represents the sum of the addresses applied by switch 201-14 and constant signals provided by skip control circuits of block 201-26. Briefly, the different positions of switch 201-14 are selected in response to microinstructions read from control store 201-10 to provide appropriate addresses for microprograms stored in control store 201-10 required for the execution of an operation specified by the op code of a program instruction. The instruction op code is applied to the pathfinder memory 201-2 via path 201-6 as shown. The return address register position of switch 201-14 is selected during program sequencing as a consequence of a branch operation while the constant register position is selected to provide for a branch to a predetermined location in the control store 201-10 defined by the constant field of the microinstruction stored in register 201-15.

Interrupts are processed at the completion of execution of a program instruction. It is seen in FIG. 2 that a higher level interrupt present (HLIP) and level zero interrupt (LZP) lines apply signals to switch 201-14. The signal applied to the HLIP line is "ANDed" with interrupt inhibit signals from a process control register 204-22 and the result is ORed with the signal applied to the LZP line. When the higher level interrupt present signal is not inhibited or there is a signal applied to the LZP line, signals from circuits, not shown connected to switch 201-14 select the exception/interrupt position. The signal lines indicative of the presence of an interrupt (LZP and HIPL) cause the selection of an interrupt sequence of microinstructions to be referenced in lieu of referencing the microinstruction sequence for executing the next program instruction.

Signal lines indicative of "exceptions" are applied to control circuits, not shown, associated with switch 201-14 and cause the selection of the exception/interrupt position. This provides an address for referencing an exception sequence of microinstructions. Depending upon the type of execution, the exception may be processed immediately because continuing program instruction execution must be prevented or it is not possible (e.g. faults, illegal instructions). The exception is processed upon the completion of execution of the program instruction where the condition does not require immediate attention (e.g. time out, overflow, etc.). As explained herein, the occurrence of exceptions cause the exception/interrupt position of 201-14 to be selected and the setting of an appropriate bit position in process control register 204-22.

Timing signals, designated as PDA in FIG. 1, required for establishing appropriate memory cycles of operation for control section as well as timing signals for operating other sections of processor 200 and the other modules of the system of FIG. 1 are provided by clock circuits included within a block 201-30. The clock circuits receive as an input the STOP line which, when in a binary ONE state, inhibits further operation of control section 201. The block 201-30 includes circuits for signalling the SIU 100 via the OPI line that the processor 200 is operational. For the purposes of the present invention, the clock circuits as well as the other circuits of FIG. 2 can be considered conventional in design and can, for example, take the form of circuits disclosed in the publication titled "The Integrated Circuits Catalog for Design Engineers," by Texas Instruments Inc., printed 1972. More specifically, the clock circuits can comprise a crystal controlled oscillator and counter circuits while the switch 201-14 can comprise a plurality of data selector/multiplexer circuits.

From the above, it is seen that, as in most microprogram controlled machines, the control store 201-10 provides the necessary control for each processor cycle of operation. That is, each microinstruction word read out from control store 201-10 during a cycle of operation is divided into a number of separate control fields which provide the necessary input signals to the various selector switches of FIG. 2 for addressing of the different scratch pad memories and selection for branching, signals for controlling the operation of an adder/shifter unit of section 204 and signals for providing control information necessary for generating commands. For more detailed information regarding the operation of control section 201, reference may be made to the copending application titled "Pathfinder Control Memory" invented by G. Wesley Patterson et al., now U.S. Pat. No. 4,001,788 which is assigned to the assignee of the present invention. Reference may also be made to other ones of the documents referenced in the introductory portion of the specification.

INSTRUCTION BUFFER SECTION 202

This section includes a plurality of registers 202-2 for storing up to four words of instructions fetched from local memory module 500 and applied via a data in register 204-18. The group of registers 202-2 are connected to a two position instruction register switch 202-4 which is arranged to provide two outputs, a current instruction read output (CIR) and a next instruction read output (NIR). The selection of instruction words on a half or full word basis is made in accordance with the states of bit positions of the current instruction counter (IC) normally stored in a first of the working registers of block 204-12. For the purpose of the present invention, the arrangement can be considered conventional in design.

STORAGE SECTION 203

As seen from FIG. 2, this section comprises a scratch pad memory containing eight sets or groups or registers associated with eight priority levels. The highest priority level is level 0 and the lowest priority level is 7. Each group or level includes 16 registers used as described herein.

The scratch pad memory 203-10 is addressed via an eight position data selector switch 203-14 which selectively applies a seven bit address from any one of eight sources to address inputs 203-12. The three most significant bit positions of address inputs 203-12 select one of the eight sets of registers (i.e. the level) while the remaining four bits select one of the sixteen registers. Signals applied to the active interrupt level (AIL) lines by the SIU 100 provide the three most significant bits to the scratch pad address inputs 203-12. The remaining signals are provided by control store register 201-15 or fields from the instruction applied via the IRSW.

The write address register 203-22 is loaded via switch 202-4 to store signals corresponding to either bits 9–12 or bits 14-17 of the current program instruction as designated by one of the fields of the microinstruction contained in register 201-15. Accordingly, the write address register provides address storage for loading or returning a result to one of the general registers of scratch pad memory 203-10. The write operation occurs upon the generation of a write clock signal which occurs either in response to switching to a binary ONE a clocked write flip-flop not shown, or in response to a field of a microinstruction loaded into register 201-15. When generated by the write flip-flop, the write clock signal occurs when the write flip-flop is reset to a binary ZERO upon the occurrence of a next PDA clock pulse. This allows a write operation relating to a program instruction to occur during the start of processing the next instruction.

It will be noted that the contents of the write address register 203-22 are applied to a decoder network 203-28 via selector switch 203-14 which is operative to generate a signal on an output line each time register 203-22 stores an address of 0, 1 or 15. This signal inhibits the generation of a write clock pulse by gating circuits, not shown, when write flip-flop is in a binary ONE state. Additionally, the decoder network 203-28 receives a mode signal from the process state register 204-20. The state of the signal which indicates whether the processor 200 is in a master or slave mode of operation is "ANDED" with the output signal and is used to generate an exception signal on another output line which is applied as an input to process control register 204-22 and to one causes selection of the exception-interrupt position of switch 201-14. As explained herein, this prevents alteration of the contents of the process state register location (GR0) of scratch pad memory 203-10.

The contents of an addressed register location are read out into a scratch buffer register 203-16 via a first two position data selector switch 203-18. The contents of the buffer register 203-16 are then selectively applied to processing section 204 via a further two position data selector switch 203-20. The different positions of each of the data selector switches 203-14, 203-18, and 203-20 are selectable by different fields contained in the microinstructions read out into register 201-15. The scratch pad memory 203-10 receives data signals applied from one of a pair of output buses selectively connected to any one of four working registers of block 204-12.

Each set of 16 registers includes a process state register (PSR) location (general register 0) for storing information essential to controlling the current process. The first eight bit positions of the register stores steering information coded to identify the interrupting module. The next position is a privilege bit position coded to identify the mode of operation (i.e. master or slave). The register also includes an external register bit position coded to indicate whether the register contents can be altered, an address mode bit position, two condition code bit positions, a carry bit position and 22 bit positions for storing a count which is periodically decremented while the associated process is active (i.e. serves as a "process timer"). Because of the frequency of access to the contents of the process state register required for modification or reference, signals representative of the contents of this register are stored in one of the registers of the processing section 204 (i.e. register 204-20). Thus, the general register storage location for storing the contents of the process state register serves to store the current value of the process state register of section 204 upon the occurrence of an interrupt.

Each group of registers further includes an instruction counter (general register 1) for storing the address of the current instruction of the process associated therewith. Additionally, each group of registers includes a page table base register (general register 15), and a number of general registers (general registers 2-14) for providing temporary storage for operands and address information. The scratch pad memory 203-10 also includes a control block base (CBB) register location which stores an absolute address pointing to the base of an exception control block and interrupt control block tables stored in local memory module 500. The first register GR0 of the highest priority set of registers (level 0) which is never altered, stores the control block base information. The interrupt control block (ICB) tables include 256 groups of storage locations which store information for processing the type of interrupt. The exception control block (ECB) tables include 16 groups of storage locations which store information for processing the type of exception.

Exceptions are processor detected conditions which cause the processor 200 to enter automatically one of the 16 exception processing routines. The exception conditions are identified by a four bit exception number which corresponds to bits 10-13 of the program instruction when the processor enters master mode. In all other instances, the exception number is ZERO. The exception number (ECB#) is used to identify one of the four word exception control blocks (ECB) which points to an exception processing routine. The byte address of an ECB equals the control block base (CBB) - 16 (ECB# + 1). Each ECB includes values for loading the PSR, IC, and PTBR registers in addition to a saving area pointer in ECB#0 which points to a stack area for storing information pertinent to the current process before the processor 200 enters the exception routine.

The address of an interrupt control block (ICB) equals the control block base (CBB) + 16 (ICB#). The ICB# is obtained from the interrupt word as explained herein. Similarly, the ICB is a four word block and it contains values for the PSR, IC, GR14, and PTBR registers.

PROCESSING SECTION 204

This section performs all of the arithmetic and logic operations required to process program instructions. The section 204 includes an adder/shifter unit 204-1 capable of performing arithmetic, shift, and logic operations upon a pair of 36 bit operands. The results produced by either an adder portion or shifter portion of unit 204-1 are selected in response to microinstructions and thereafter selectively transferred via a four position data selector switch 204-8 on a pair of output lines to any one of the working registers of block 204-12 and to a data output register 204-14. The data output register 204-14 connects to the lines of the processor data interface 600.

For the purposes of the present invention, the adder/shifter unit 204-1 can be considered conventional in design. Also, the unit 204-1 may include either circuits such as those disclosed in U.S. Pat. No. 3,811,039 to John P. Stafford or circuits disclosed in other documents referenced in the introductory portion of the present specification.

The block 204-12 includes four working registers R0 through R3 which provide temporary storage for the instruction counter and for addresses during instruction execution. The registers can be loaded from any one of the sources connected to switch 204-8 (i.e. adder/shifter 204-1, address switch 204-6, PSR/PCR switch 204-24 and scratch pad buffer input switch 203-18). The register to be loaded and the write signal required for loading the register is established by fields included within the microinstruction read out to register 201-15.

As seen from FIG. 2, the registers are connected to a pair of output buses WRP and WRR. The WRP bus connects to address inputs 204-5, to switch 203-18 and to scratch pad memory 203-10. The WRR bus connects to A operand switch 203-20, to B operand switch 204-1, to register 204-20 and to register 204-22. The registers selected for connection to the WRR and WRP buses are designated by a pair of fields included within the microinstruction read out to register 201-15.

As seen from FIG. 2, the processing section 204 includes process state register 204-20 and a process control register 204-22. The process state register 204-20, as mentioned, is loaded from scratch pad memory 203-10 via output bus WRR. The process control register 204-22 is a 36 bit register common to all eight interrupt levels.

The bit positions of the process control register 204-22 contain the following information. Bit positions 0-8 designate different types of exceptions which include the following.

| PCR BIT POSITION | EXCEPTION TYPE |
| --- | --- |
| 0 | Operation not complete; no response from SIU on lines ARA or ARDA. |
| 1 | Page address bounds fault (key check). |
| 2 | Page access fault. |
| 3 | Page not resident in memory. |
| 4 | Illegal operation (invalid instruction, illegal slave instruction, or illegal slave operation). |
| 5 | Process timer run out. |
| 6 | Overflow. |
| 7 | Lockup fault. |
| 8 | Address misalignment |

The term "fault" does not necessarily mean the occurrence of a hardware failure, but includes programming errors, etc.

Bit positions 9-12 store the parity errors detected per data path substrate. Bit position 13 indicates when a parity error is detected in the Data In register. Bit positions 14-15 store indications of parity errors detected per control store and pathfinder memory. Bit 15 signals no response to the level zero interrupt present. Bit positions 23-26 identify the processor number and level received from the PNID and AIL lines. Bit position 27 is an interrupt inhibit bit position while bit positions 28-35 store interrupt request bits which, when set to a binary ONE, indicate an interrupt request to a level corresponding to the bit position (i.e., bit 28 = level 0). The bit positions 27-35 are loaded by program instruction from the bank of registers of block 204-12 via output bus WRR. Bit position 35 is always set to a binary ONE.

The contents of each of the registers 204-20 and 204-22 are selectively applied as an input to another one of the positions of the four position data selector switch 204-8 via a two position data selector switch 204-24. The register 204-20 also connects to the PI positions of a two position steering selector switch 204-10 and a four position address selector switch 204-6.

The steering switch 204-10 provides steering information to the SIU 100 which is used to transfer the command to the correct module. One of the fields contained in the microinstructions read out to register 201-15 selects the appropriate position for either a memory command or PI command. The steering information for a memory command is generated from fields included within the microinstruction and with paged address information from scratch pad memory 204-4 or absolute address information from bus WRP.

In the case of a PI command, the steering information is generated as follows: bit 0 is forced to a binary ONE for a PI command; bits 1-4 correspond to bits 0-3 of register 204-20; and bits 5-6 correspond to bits of one of the fields of the microinstructions which are coded to designate whether it is a single or double word transfer and whether it is a read or write cycle of operation. Upon the start of a memory cycle or initiation of a command, the signals from the steering switch 204-10 are loaded into a steering register 204-16 which applies the signals to the appropriate lines of the data interface 600 of processor 200. As explained herein, the command including additional steering information is provided by position 2 of address switch 204-6 in the case of a PI command.

As also seen from FIG. 2, processing section 204 includes a scratch pad memory 204-4 addressable via address inputs 204-5 which receives address signals from one of the registers connected to the WRP bus. The scratch pad memory 204-4 provides page table word storage for each of the eight interrupt levels used in generating absolute addresses for addressing local memory module 500. When addressed, the contents of the storage location of scratch pad memory 204-4 are read out to two of the four positions of the address switch 204-6. These two positions are used for page referencing of local memory module 500. Since the paging operations of scratch pad memory 204-4 are not particularly pertinent to the present invention, no detailed discussion is included herein. For further information regarding the use of paged addressing, reference may be made to the documents cited at the introductory portion of the specification.

The other two positions of the address selector switch 204-6 are used to provide the memory or PI command. More specifically, positions 0 and 1 of address switch 204-6, when selected by an address control field of a microinstruction word stored in registor 201-15, generates the R/W memory command information which includes bits 0-8 coded in accordance with predetermined fields of the microinstruction word and bits 9-35 coded to correspond to either paged address information from memory 204-4 (position 0) or absolute address bits applied to output bus WRP by the working registers of block 204-12 (position 1). When the PI position of switch 204-6 is selected, the switch generates a programmable interface command word wherein bit 0 is a binary ZERO, bit 1 is supplied by a field of the microinstruction word stored in register 201-15, bit 2 is supplied by bit 9 of PSR register 204-20 and defines whether the current process can alter certain external registers, bits 5-8 are equal to bits 4-7 of register 204-20 and define the port or sub-channel within the module, bit 3 is coded to specify the processor pair number supplied by the SIU 100, bit 4 is a ZERO and bits 9-35 equal bits 9-35 of bus WRP which correspond to the absolute address of the PI command.

DETAILED DESCRIPTION OF SYSTEM INTERFACE UNIT 100

Interrupt Section 101

Figure 3A:
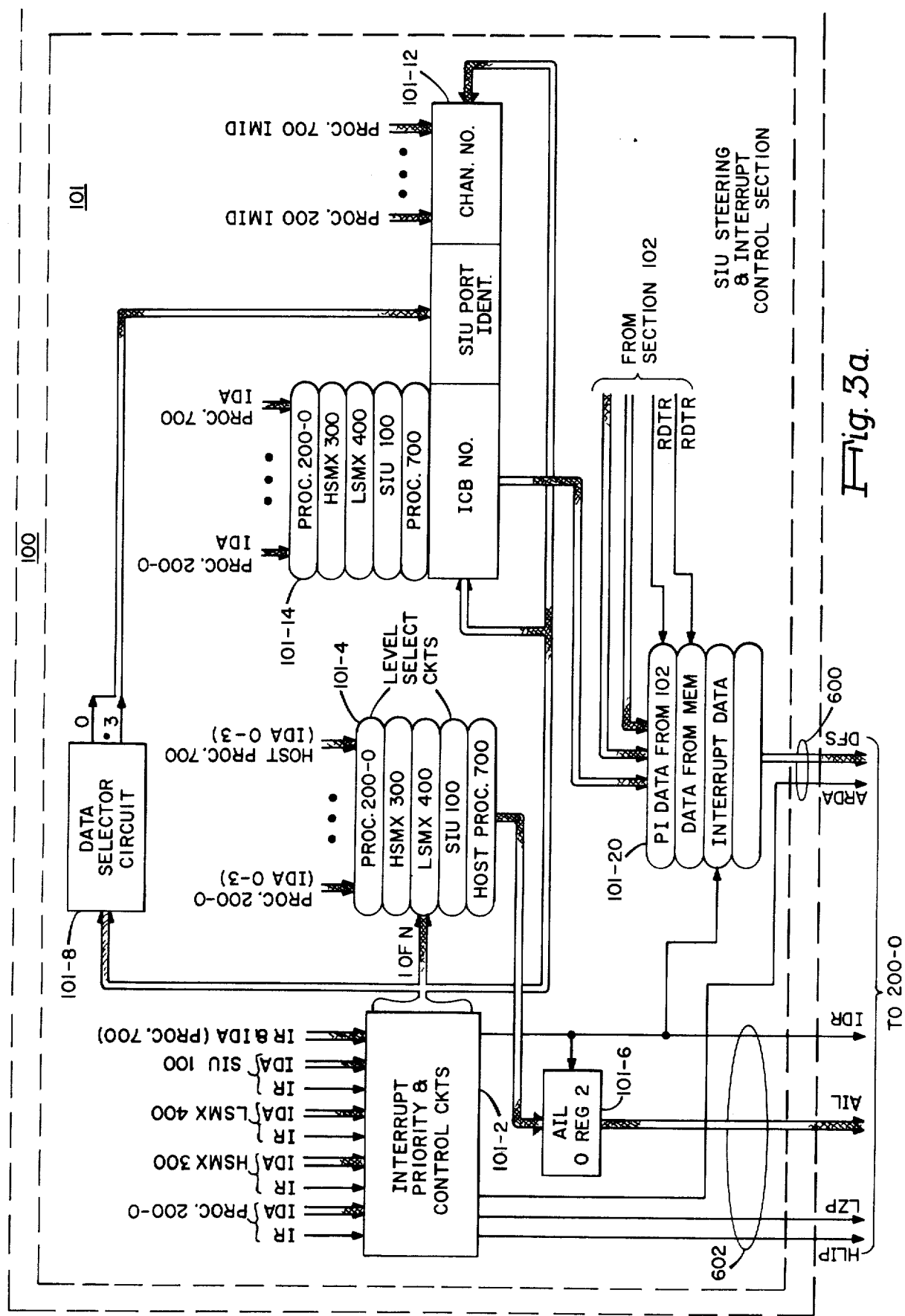
FIGS. 3a through 3b show in greater detail the system interface unit of FIG. 1.

The System Interface Unit 100, as mentioned, provides for communication between modules of the system of FIG. 1 via a plurality of crossbar switches. Separate crossbar switches are used to collect signals from the lines of each of the different interfaces of the modules. FIG. 3a shows the switches and circuits of interrupt section 101 for handling the module interrupt interfaces. In the system of FIG. 1, there are modules which connect to ports LMO, A, E, G, and J, each of which applies signals to the SIU 100 via different ones of the lines of its interrupt interface 602. Additionaly, SIU 100 also provides signals via an interrupt interface associated with port L of FIG. 1.

As seen from FIG. 3a, each of the modules when requesting service applies a signal on its interrupt request (IR) line together with appropriate interrupt identifier information on its IDA lines which are applied to the circuits of an interrupt priority and control block 101-2. The circuits of block 101-2 monitor all interrupt interfaces and signals the appropriate processor pair 200-0 referred to herein as processor 200 when there is a request having a priority higher than that of the process being executed. When processor 200 signals that it is able to accept the request, the SIU 100 gates the identifier information associated with the highest priority request to the processor. The identifier information includes an eight bit interrupt control block number including a parity bit, a three bit interrupt level number and a one bit processor number with a parity bit and a four bit channel number.

Considering interrupt section 101 in greater detail, the circuits of block 101-2 include decoder circuits which decode the processor number and interrupt request signals. Providing that there is no parity error, the output signals from the decoder circuits are applied to priority logic circuits of the designated processor logic circuits. The priority logic circuits decode the interrupt level signals and determine the highest priority level and then determine the port priority so that the module having the highest priority level and highest port priority is selected. The interrupt port priority within any given level is as follows:

Old; port L; port A, port B, port C; port D; port E; port F, port G; port H; port J and port K.

This means that in the system of FIG. 1 the port of the current process has the highest priority followed by the SIU 100, the high speed multiplexer 300, the host processor 700, the processor 200, and the low speed multiplexer 400.

The priority circuits of block 101-2 are operative to generate an output signal on one of $n$ number of output lines, $n$ corresponds to the number of interrupting modules within the system. The $n$ output lines are applied to an eight position data selector switch 101-4 which selects the interrupt level signals of a level of interrupt having a priority higher than the level currently in progress to be loaded into a register 101-6. The output signals from register 101-6 are applied to the AIL lines when processor 200 forces the IDR line to a binary ONE in response to the SIU 100 having forced prior to the higher level interrupt present (HLIP) line or the level zero present (LZP) line to a binary ONE. When the current process is not inhibited from being interrupted, an interrupt request causes the processor 200 to suspend the current process and to accept an interrupt word from the SIU 100 including the identifier information mentioned previously. More specifically, the interrupt word is formatted as follows.

Bit 0 is a new interrupt bit position. When set to a binary ONE indicates that the interrupt is a new one and when set to a binary ZERO indicates that the interrupt is that of a previously interrupted process that is to be resumed.

Bits 1-17 are unused and are binary ZEROS.

Bits 18-27 define the interrupt control block number with bits 18 and 27 being set to binary ZEROS.

Bits 28-31 are generated by the SIU 100 and identify the source module as explained herein in accordance with the present invention.

Bits 32-35 are generated by the modules having multiple ports and identify the subchannel or port within the source module as explained herein in accordance with the present invention.

For more detailed information regarding the implementation of the circuits of block 101-2, reference may be made to the copending patent application titled "Priority Interrupt Hardware" referenced in the introductory portion of the specification.

It is also seen that the output lines from interrupt priority circuits 101-2 are applied to a further data selector switch circuit 101-8. Since only the requesting module having the highest priority will apply a signal to selector circuit 101-8, the selector circuit is connected to provide a predetermined wired-in set of coded steering signals which identify the physical port to which the requesting module granted priority connected (i.e. bits 28-31 of the interrupt word).

In the present embodiment, the following steering codes are generated for identifying the modules of FIG. 1.

| CODE | SIU PORT (MODULE) IDENTIFIED |
|------|------------------------------|
| 0000 | Local memory module - port LMO |
| 0001 | port K |
| 0010 | SIU 100 - port L |
| 0101 | Low speed multiplexer 400 - port J |
| 0110 | processor 200 - port G |
| 1101 | high speed multiplexer 300 - port A |
| 1110 | host processor 700 - port E. |

The four bit code generated by the selector circuit 101-8 is in turn applied to a group of conventional AND gating circuits included within a gating network 101-12. The other identifier information provided by the different source system modules are also applied to other gating circuits of network 101-12. Specifically, each module applies as interrupt control block number (ICBN) via its IDA lines to a different one of the positions of an eight position data selector switch circuit 101-14. Additionally, each module provides the information identifying the requesting subchannel or port of the source module to other ones of the gating circuits of network 101-12 via the IMID lines of the interrupt interface. When the processor 200 forces its interrupt data request (IDR) line to a binary ONE, the SIU 100 applies the signals from gating network 101-12 to the data from SIU (DFS) bus lines of the processor data interface 600 via one of the positions of a four position data selector switch circuit 101-20. The other positions of switch 101-20 are not shown since they are not pertinent to an understanding of the present invention.

DATA TRANSFER SECTION 102

Figure 3B:
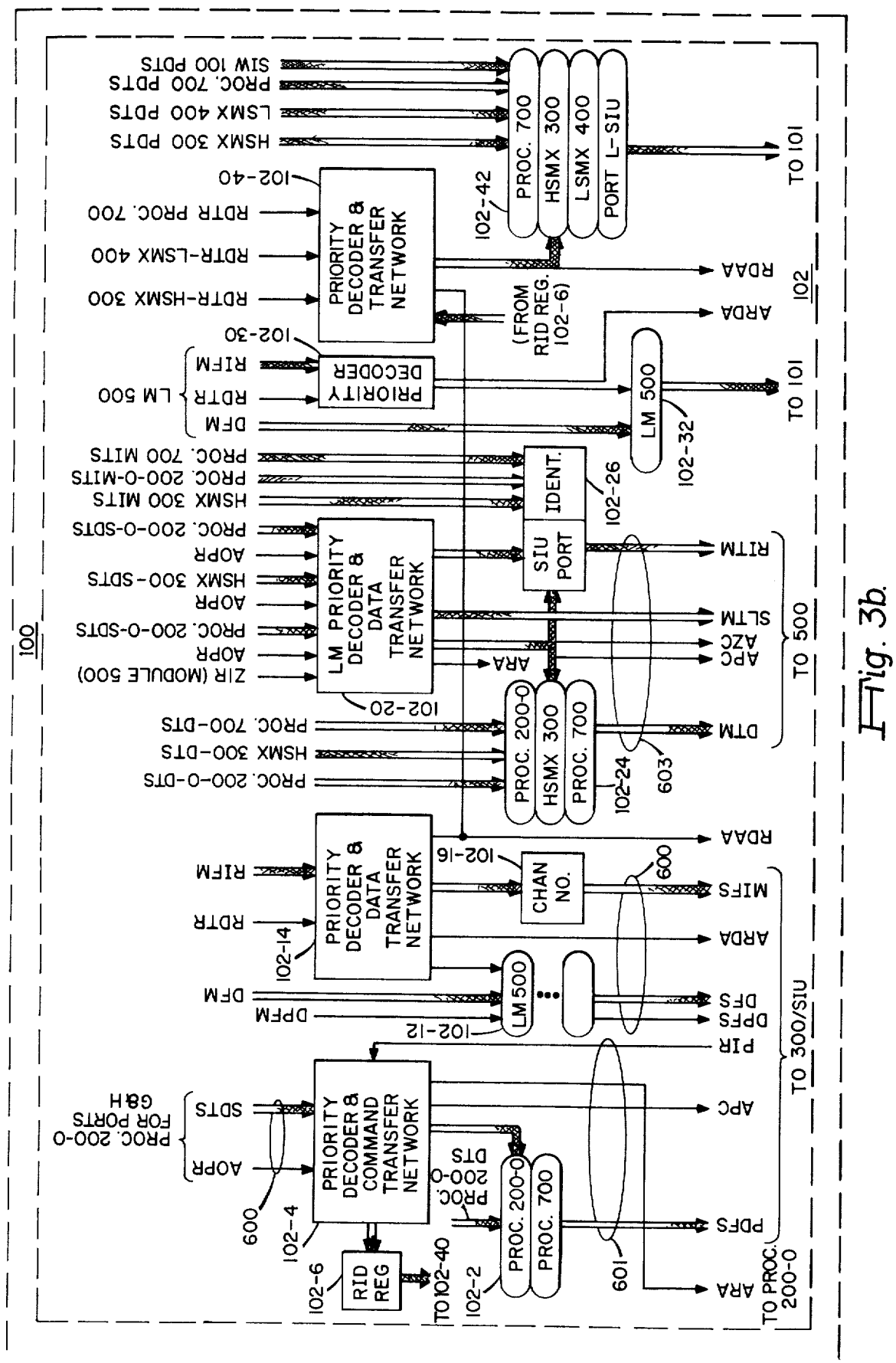

FIG. 3b shows the data transfer section 102 of the system interface unit 100. This section includes priority circuits which establishes which source module is to transfer commands to the high speed multiplexer 300 on its programmable interface 601 and which source module is to transfer data to the multiplexer 300 on its data interface 600. Additionally, section 102 includes priority circuits which determine which source module is going to transfer either data or commands to local memory module 500.

It will be appreciated that transfers between a pair of modules occurs when one module has generated a request to the other module and that the request has been accepted by the other module. In order for a request to be accepted, the requesting module must have the highest priority, both modules must be in a state to receive information and that the transfer path over which the transfer is to take place must be available (i.e. not busy).

As concerns the signals applied to section 102 by processor 200, the generation of these signals is to a large extent controlled by the different fields of the microinstructions read out into processor register 201-15 of FIG. 2. For example, the active output port request (AOPR) line from processor 200 applied to the circuits of block 102-4 is enabled in accordance with a SIU request type control bit field of each microinstruction read out to register 201-15 which is coded to define a transfer of a read/write memory or programmable interface command. The data to SIU lines (DTS) of the processor data interface 600 applied to a two position data selector switch 102-2 constitute command information generated under microprogram control which is loaded into the processor data output register 204-14 of FIG. 2. The steering data to SIU (SDTS) lines receive signals generated under microprogram control which are loaded into the processor steering register 204-16 of FIG. 2.

For the system of FIG. 1, only I/O processors transfer commands to the multiplexer 500 only and processor 200 applies signals to network 102-4. The network 102-4 therefore includes decoder circuits which decode the steering information from the processor module to establish when the module desires to transfer commands to the multiplexer 300. In the case of more than one I/O processor when more than one module desires to transfer during the same cycle, a priority network included in network 102-4 selects the module assigned the highest priority and enables the transfer of a command by that module to the multiplexer 300 on the PDFS lines of its programmable interface 601. More specifically, the network 102-4 applies signals to the two position selector switch 102-2 which selects signals from the appropriate module. This occurs when the multiplexer 300 signals the SIU 100 that it is ready to accept a command by forcing the PIR line to a binary ONE. At the same time, network 102-4 forces the APC line to a binary ONE signaling the multiplexer 300 to accept the command applied to the PDFS lines. When the processor 200 executes an instruction causing it to send a programmable interface (PI) command to the multiplexer 300, the processor 200 places the processor number identification into bit 3 of the command. The multiplexer 300 stores the processor number contained in the command until it wants to issue an interrupt request at which time the processor number is included as part of the interrupt data as explained herein. When the PI command is forwarded to multiplexer 300, the steering information identifying processor 200 as the requester is stored in a register 102-6 associated with multiplexer 300 (port A). As explained herein, when multiplexer 300 responds by generating a read data transfer request to SIU 100, the contents of register 102-6 is used to identify processor 200 as the actual module to receive the data.

A similar arrangement is employed for transferring data signals to multiplexer 300. In FIG. 1, memory module 500 is the only module which transfers data to multiplexer 300. Such transfer occurs in response to a read memory command (ZAC) forwarded to the memory module 500 by multiplexer 300 via network 102-20 as explained herein. When multiplexer 300 forwards the command, the SIU 100 generates the appropriate 4 bit requestor identifier code (steering code) which it appends to the multiport identifier information received from multiplexer 300. The information is stored by the memory module 500 and returned to the SIU 100 when the module 500 generates a read data transfer request to designate that multiplexer 300 is to receive the data. Also, when the SIU 100 accepts the request, it notifies the multiplexer 300 by forcing line ARDA to a binary ONE.

The read data transfer request (RDTR) line when set by memory module 500 signals the network 102-14 that it is ready to transfer information read out during a cycle of operation. The local memory module 500 also supplies signals to the requestor identifier from memory (RIFM) lines to identify the requesting module to which the information is to be transferred.

More specifically, circuits within a decoder network 102-14 decode the identify signals applied to the RIFM lines and when the signals indicate that the local memory module 500 is ready to transfer information to the multiplexer 300 (assumed the multiplexer 300 is ready to receive the information), the decoder network 102-14 applies the appropriate signals to the selector switch 102-12 and circuits within a gating network 102-16.

Additionally, decoder network 102-14 applies a signal to the accept read data (ARDA) line of the data interface signaling the multiplexer 300 that it is to accept the data from SIU (DFS) lines of its interface 600. The circuits of block 102-16 apply the appropriate multiport identifier information to multiport identifier from SIU (MIFS) lines identifying the requesting subchannel which is obtained from the RIFM lines. When the transfer has taken place, the network 102-14 forces the RDAA to a binary ONE signaling the requesting module that the data has been accepted from memory module 500.

An arrangement similar to network 102-14 is used by SIU 100 to transfer PI and memory commands from any one of the modules of FIG. 1 to local memory module 500. The module 500 is operative to force either the programmable interface request (PIR) line or ZAC interface request (ZIR) line applied to a decoder network 102-20 to a binary ONE when it is ready to accept either a programmable interface or memory command. Additionally, the processor 200, the processor 700, and multiplexer 300 apply a network 102-20 signals to the active output port request (AOPR) line and steering data to SIU lines of their respective data interfaces. The network 102-20 upon decoding the steering information applied by each of the modules is operative to generate the appropriate signals to a three position selector switch 102-24 for enabling the module having the highest priority to apply signals to the data transfer to SIU lines of memory module data interface 603. It is also seen that network 102-20 applies signals to either the accept programmable command (APC) line or accept ZAC command mode (AZC) together with the appropriate requestor identification signals on the request identifier to memory (RITM) lines of the local memory module interface 603 via a gating network 102-26.

The last two networks 102-30 and 102-40 are used to transfer memory data and programmable interface data to processor 200 in response to memory commands and PI commands respectively previously generated by the processor 200. As seen from FIG. 3b, the priority decoder network 102-30 has the same input lines as network 102-14 and operates in the same manner to forward the requested memory data to processor 200 via a data selector switch 102-32 and the four position selector switch 101-20 of FIG. 3a. It will be appreciated that since processor 200 processes a single command at a time, there can be no conflict between the modules applying data to selector switch 101-20 for transfer to the processor DFS lines in response to processor requests. That is, after the processor 200 sends a command to one of the modules of FIG. 1, its operation is stalled pending receipt of the requested data. The SIU 100 upon accepting the processor's request forces the processor's ARA line which causes the processor to delay operations.

The separate network 102-40 processes return data requests from those modules responding to PI commands. The network 102-40 decodes the signals applied to the RDTR lines and from register 102-6 together with registers of the other modules, not shown. When the SIU 100 detects that module is trying to return requested data to processor 200 (ie. requestor identifier stored in multiplexer 300 register 102-6), the network 102-40 generates signals which conditions a three position data selector circuit 102-42 to apply the signals from the PDTS lines of the PI interface of the module trying to return requested data to processor 200. These signals are in turn applied to the processor's DFS lines via selector switch 101-20 of FIG. 3a which is conditioned by the module request signal. During a next cycle of operation, the network 102-40 forces the RDAA line to a binary ONE signalling the module that the data applied to the PDTS lines has been accepted and that the module can now remove such data (i.e., clear its output register). Thus, it is seen that switch 101-20 selectively applies any one of three types of data to the DFS lines of the processor's data interface 600.

For the purpose of the present invention, the circuits included within different ones of the blocks of FIG. 3b may be considered conventional in design and include logic circuits found in the aforementioned publication by Texas Instruments Inc. Also, for the purposes of the present invention, the switching networks can comprise conventional crossbar switches.

CONTROL SECTION 103

Figure 4A:
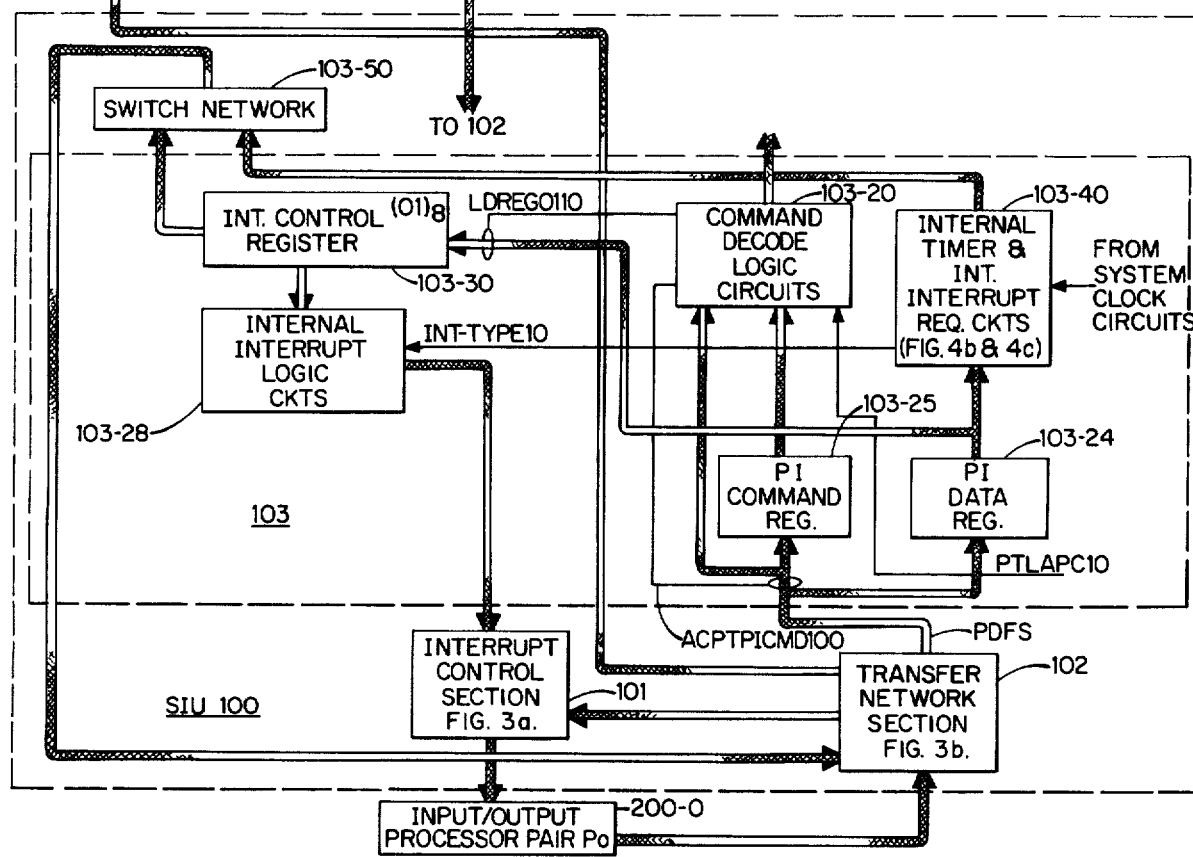
FIG. 4a is a block diagram of the system of FIG. 1 incorporating the apparatus of the present invention.

The above sections of SIU 100 form part of the block diagram of FIG. 4a. Referring to FIG. 4a, it is seen that SIU 100 further includes a control section 103. Section 103 includes the circuits of blocks 103-20, 103-24 and 103-25 which connect to a PI interface 603 and interpret and execute PI commands directed to the SIU internal logic circuits through port L. The PI commands are normally generated by processor pair PO and applied via transfer network section 102 of FIG. 3b.

As seen from FIG. 4a, the internal logic circuits in addition to the circuits which process PI commands include an interval timer 103-40, internal interrupt control register 103-30 which feeds internal interrupt logic circuits 103-28. These circuits in construction are similar to the priority interrupt logic circuits 101 shown in FIG. 3a. The internal interrupt logic circuits 103-28 generate eight types of interrupts. The interrupt types pertinent to the present invention are as follows:

1 = interval timer exhaust generated by the interval timer counting through zero;
4 = processor error, detected with no mis-compare;
5 = mis-compare error detected along with a processor error; and,
6 = mis-compare error with no other errors existing.

The interrupt priority within port L is based on type number and the priority is as follows:

| Type | | |
|---|---|---|
| 4 | — | highest |
| 5 | | |
| 6 | | |
| 7 | | |
| 0 | | |
| 1 | | |
| 2 | | |
| 3 | — | lowest |

The interrupt types 4–7 are hardwired to level 0 while the interrupt levels for other types (i.e., 0, 1, 2, and 3) are programmable using the coded level signals stored in interrupt control register 103-30. The circuits 103-28 establish the interrupt having the highest priority and generate appropriate request signals which are applied to the interrupt logic circuits 101. The format of the request is shown in FIG. 11. As mentioned, the circuits 101 report the interrupts to the designated input/output processor pair.

The SIU internal logic circuits in response to an WREX instruction to port L enable loading different ones of the SIU registers (e.g. register 103-30) and timer 103-40 via section 102. The interrupt control register 103-39, assigned octal address 1 stores the interrupt level types. It is formatted as shown in FIG. 8a.

Figure 4B:
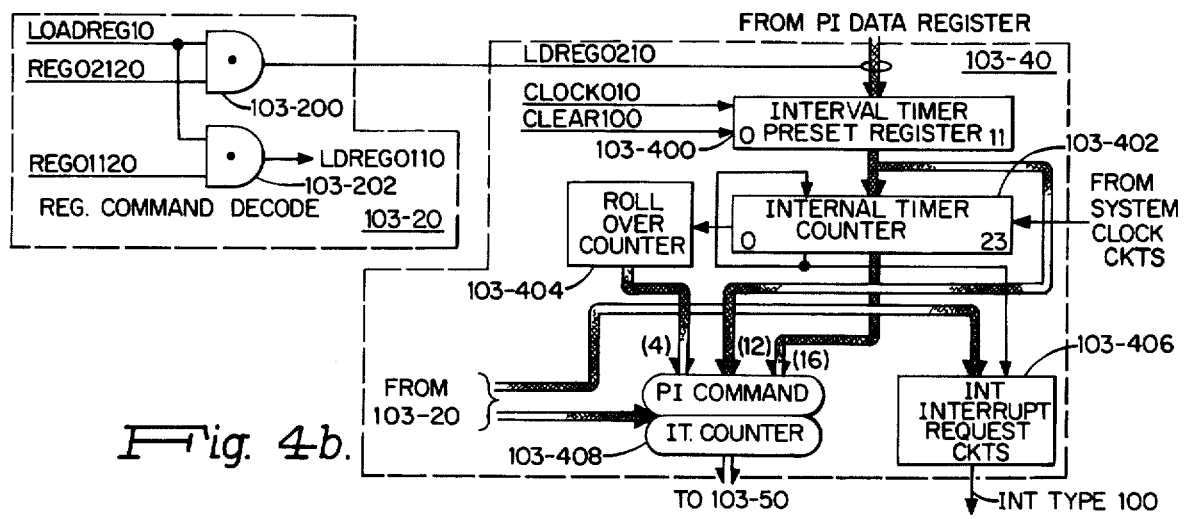
Figure 4C:
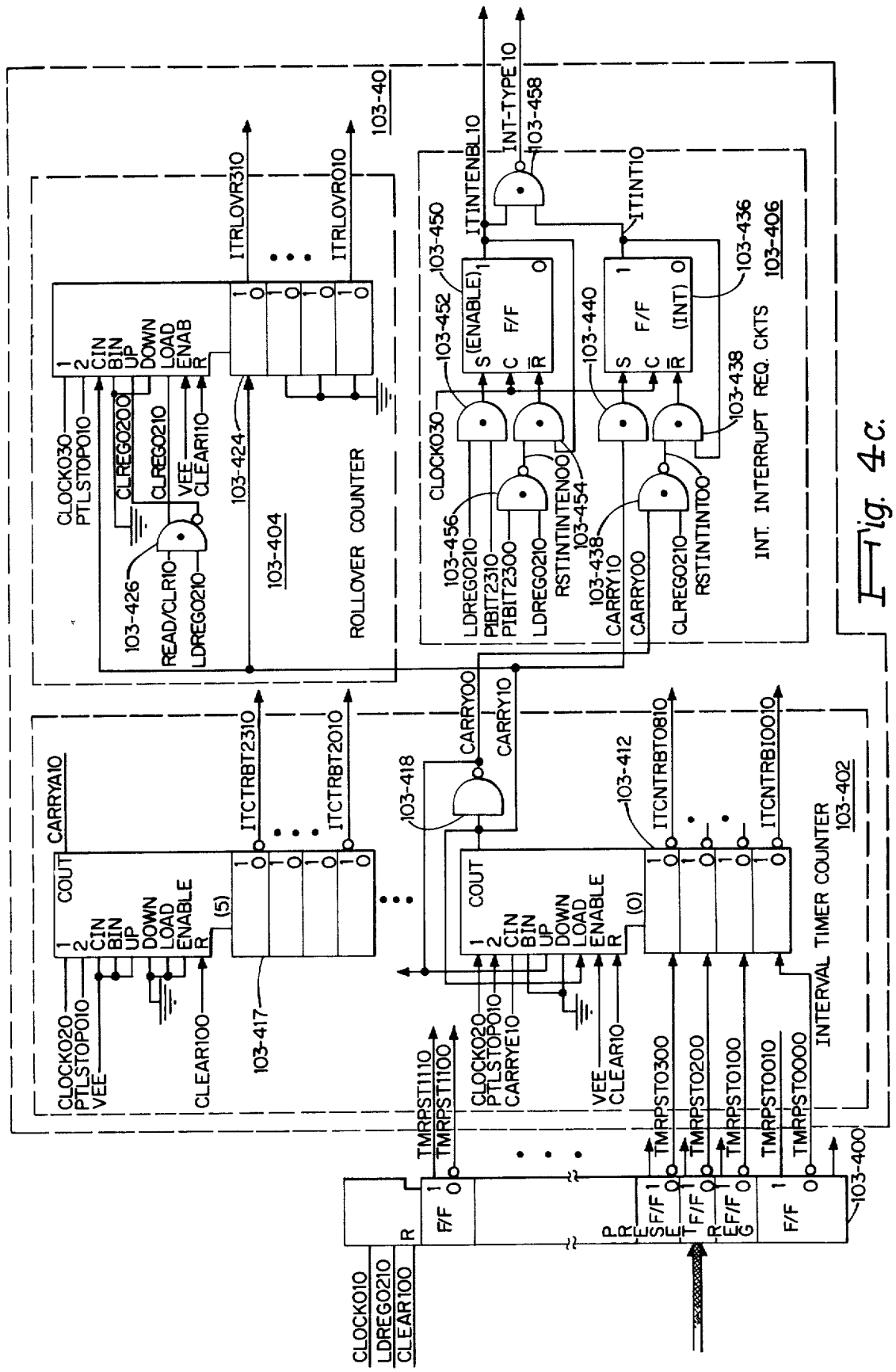
FIG. 4c shows in greater detail the timer 103-50 of FIG. 4b.

As described in greater detail with respect to FIGS. 4b and 4c, the interval timer 103-40, in accordance with the present invention, includes a 12 bit register assigned octal address 2 for storing a count defining a particular time interval. It is formatted as shown in FIG. 8b. Additionally, the SIU internal logic circuits in response to an RDEX instruction to port L enable the contents of different ones of the registers and timer 103-40 to be read via a multiposition selection switch 103-50. The timer register is formatted as shown in FIG. 8c.

FIG. 4b shows in block diagram form the interval timer 103-40 as well as a portion of the command decode logic circuits of block 103-20. As seen from FIG. 4b, the timer 103-40, a 12 bit preset register 103-400, a 24 bit counter 103-402, a 4 bit rollover counter 103-404, a number of interrupt request circuits 103-406 arranged as shown. It is important to note that only the 12 most significant bit positions 0-11 of the counter 103-402 are loaded from the preset register 103-400 via data register 103-24 in response to a load register command signal LDREG0210 generated by an AND gate 103-200 of block 103-20. A further AND gate 103-20 generates a load register signal LDREG0110 for register 103-20.

Also, it will be noted from FIG. 4b and FIG. 8c that only the 16 most significant bit positions of counter 103-402 are readable via a multiposition switch 103-408 (IT counter position) in response to a command. As seen from FIG. 8c, the contents of rollover counter 103-404 and preset register 103-400 are also read via switch 103-408.

FIG. 4c shows in greater detail the timer counter 103-402, rollover counter 103-404 and internal interrupt request circuits 103-406. Each of the counters 103-402 and 103-404 include a number of synchronous 4 bit reversible counter sections with parallel load capability. That is, counter 103-402 includes six 4 bit counters 103-412 through 103-417 while counter 103-404 includes one 4 bit counter.

The carry and borrow inputs and outputs (CIN, BIN, COUT, BOUT) enable the cascading of 4 bit counters to form counters of any length. This is accomplished by connecting the COUT and BOUT lines from a lower order counter to the CIN and BIN lines of the next order counter. The CIN or BIN line of the lowest order counter must be a binary ONE in order to advance the count. When CIN and BIN are binary ZEROS, the count is inhibited.

The COUT line from counter section 103-412 is an indication that all previous bits are binary ONES. Accordingly, the COUT line from the most significant bits of the counter is applied as a carry in input to rollover counter 103-404 and as a set input to an internal interrupt request flip-flop 103-436 of block 103-406 via a gate 103-440. The COUT line is inverted by a gate 103-418 and applied via a NAND gate 103-438 as a reset input to flip-flop 103-436.

Data may be loaded into the most significant counter sections in response to a clocking signal CLOCK020 whenever the load input is a binary ONE. In the case of the 3 most significant counter sections (bit positions 0-11) of counter 103-402, each load input associated therewith is forced to a binary ONE when the COUT signal of section 103-412 switches to a binary ONE. This enables the automatic loading from preset register 103-400 to take place. It will be noted that the ONES complement of the value stored in register 103-400 is loaded into the counter sections. This facilitates the clearing to ZEROS of the counter sections in response to a clear signal CLEAR110. Clearing only takes place when the system is powered up or initialized. As concerns counter 103-404, its load input is forced to a binary ONE via an AND/NAND gate 103-426 in response to a read/clear command to preset register 103-400 (i.e., when signals READ/CLR10 and RDREG0210 are both forced to binary ONES).

All counter sections of counters 103-402 and 103-404 are reset to binary ZEROS when reset input R is a binary ONE. When the ENAB input of the different sections of counter 103-402 and counter 103-404 are forced to binary ONES, output signals are applied at the output terminals of the counters. Since the least significant bit sections of counter 103-402 are not read out, their ENABLE inputs are binary ZEROS.

The circuits of block 103-406 include in addition to internal interrupt request flip-flop 103-436, an interrupt enable flip-flop 103-450. This flip-flop is switched to a binary ONE in response to a control command which has bit 23 set to a binary ONE (see FIG. 7b). Also, the flip-flop 103-450 is reset to a binary ZERO via a NAND gate 103-456 in response to a control command which has bit 23 set to a binary ZERO (see FIG. 7b). The binary ONE outputs of the flip-flops 103-436 and 103-450 are applied to a NAND gate 103-458 for indicating the presence of a type 1 interrupt. Both clocked flip-flops 103-436 and 103-450 are connected for RS type operation. The input sections of the flip-flops comprise a pair of AND gates, the outputs of which are connected in a "wired OR." When both the S and R inputs are binary ONES, the flip-flop is set to a binary ONE.

It will be appreciated that for the purpose of the present invention, the blocks of FIG. 4c may be constructed from circuits which are conventional in design. The aforementioned Texas Instrument text and referenced patent application may be consulted.

DESCRIPTION OF OPERATION

With reference to FIGS. 1-12, in particular FIG. 4a, the operation of the preferred embodiment of the present invention will now be described.

A central system interface (CSI) software module performs all communications between the central system and processor pair 200-0 (initiated by host processor connect instructions) or between the different modules of the system of FIG. 1 (initiated by a predetermined sequence of instructions which make an entry in a queue in local memory 500 to be dispatched later at a lower priority level). Also, the CSI module supervises all of the input/output activity handled by processor pair 200-0 under the control of a number of device handler routines. For further information regarding the CSI module, reference may be made to the copending application "Multiplexer Security System" invented by Jaime Calle bearing Ser. No. 591,563 filed on June 30, 1975 and assigned to the same assignee as named therein.

The processor pair 200-0 is operative to establish the various process priority levels which are to be utilized by the system of FIG. 1 in processing interrupts. The process levels are assigned as follows:

0 = IOPP miscompare and SIU hardware detected errors.

1 = local memory and remote memory detected errors.

2 = multiplexer data control word transfer interrupts, multiplexer 400 faults, multiplexer 300 faults.

3 = multiplexer adapter high priority services (e.g. adapter detected faults) and multiplexer 400 data transfers.

4 = multiplexer 300 adapter data transfer termination faults.

5 = SIU timer run out, multiplexer 300 adapter high level non real time events and multiplexer 400 high level events.

6 = Multiplexer 300 programmable interrupt and adapter low level events, host processor service interrupts and connects.

7 = Separe time tasks.

It will be noted that the SIU timer interrupts in accordance with the present invention are assigned a low priority relative to the other types of interrupts. The priority assignment is made by processor pair 200-0 in response to a WREX instruction having the format of FIG. 6. The instruction generates a PI command having the format of FIG. 7a. The field LT1 of the data word is coded to specify a value of 5 octal while the command word is coded to specify the number of interrupt control register 103-30.

In greater detail, the GR1 field of the WREX instruction is coded to specify which one of the general registers of scratch pad memory 203-10 contains control information to be loaded into interrupt control register 103-30 whose address is designated by address bits 32–35.

The op code of the WREX instruction is applied by switch 202-4 to memory 201-2 causing it to reference one of the locations. The contents of the location include a pair of addresses specifying addresses in control store 201-10 of the microinstruction sequences required for instruction processing. Under microprogram control, the address field of the WREX instruction is applied to the B operand inputs of adder/shifter 204-2 while the ZERO contents of the scratch pad buffer are applied to the A operand inputs. The sum corresponding to the address field of the PI command word of FIG. 7a is transferred to working register R2 of block 204.12.

Figure 10A:
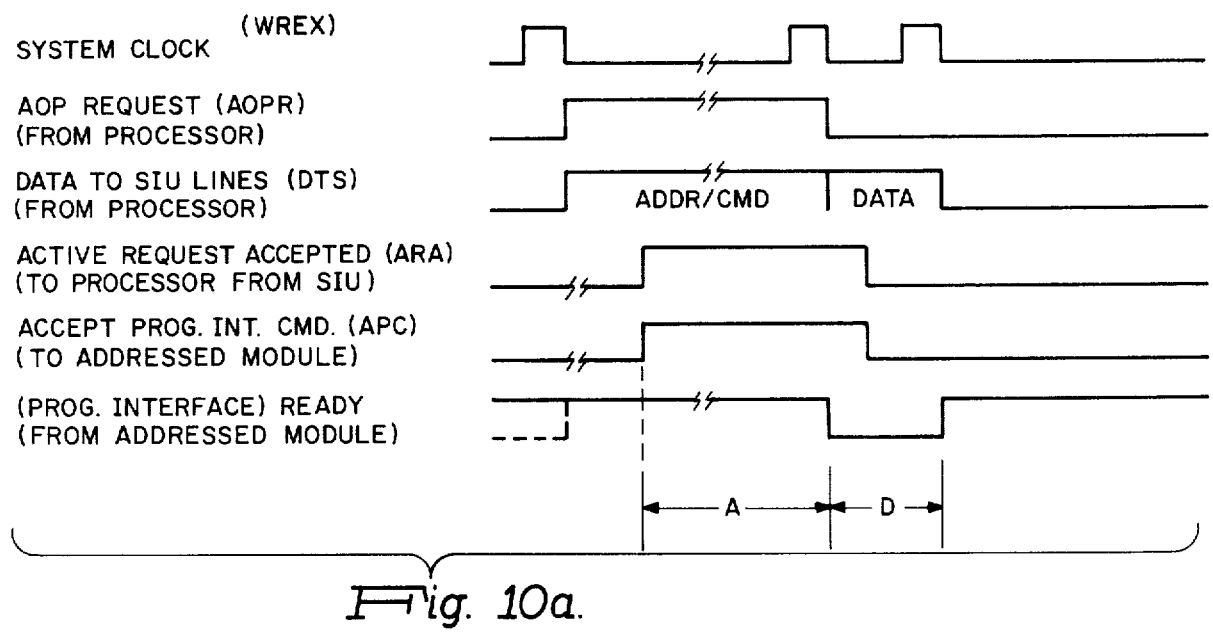
FIGS. 10a and 10b illustrate the signal sequences for transferring a WREX command.
Figure 10B:
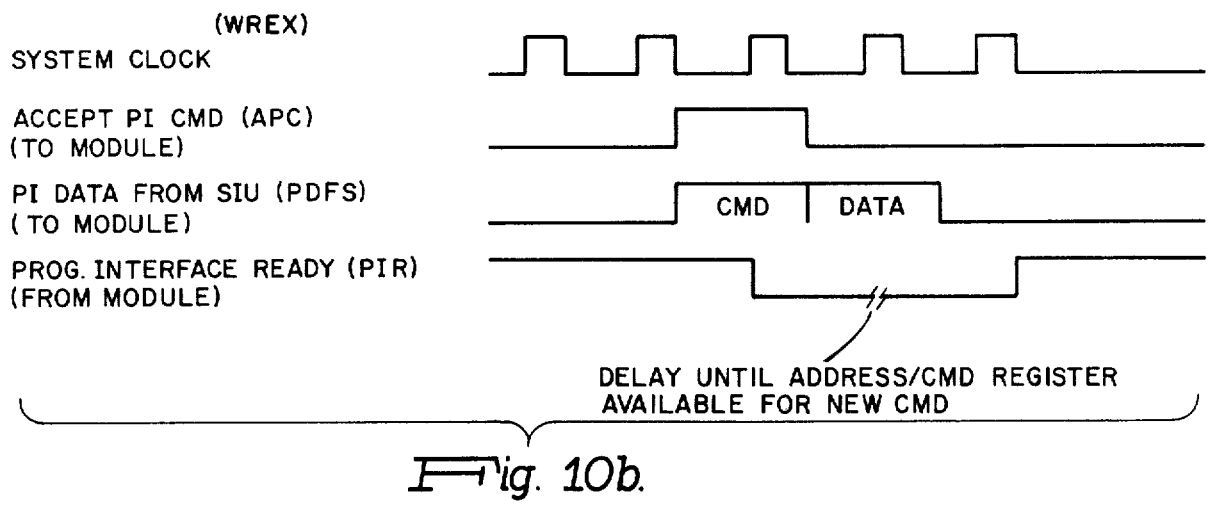
Figure 10C:
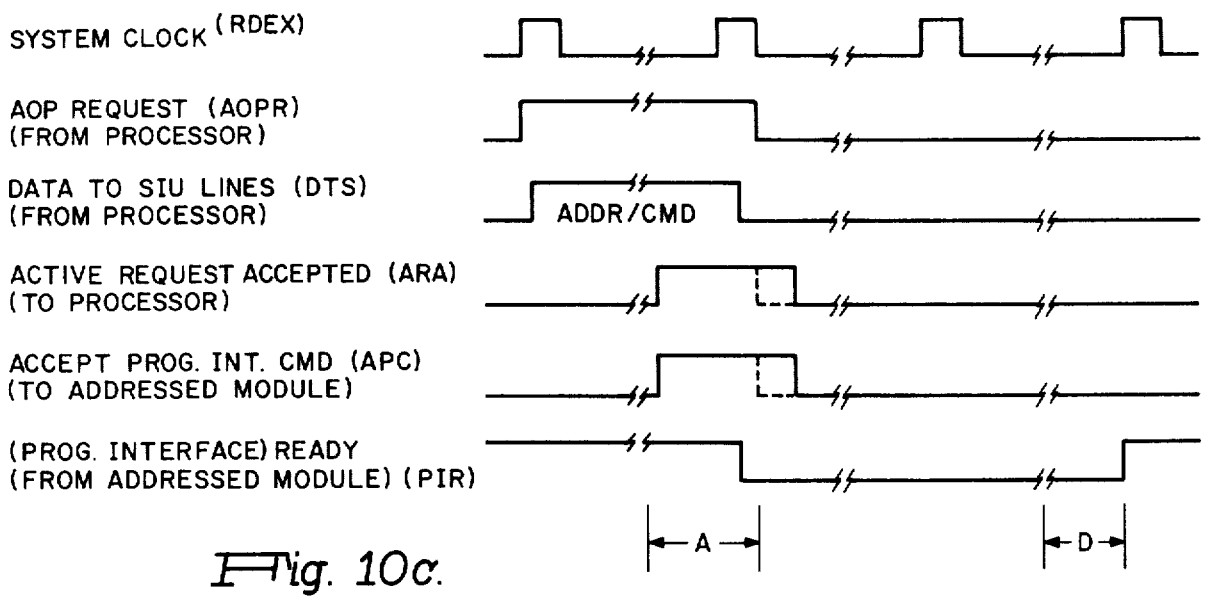
FIGS. 10c and 10d illustrate the signal sequences for transferring a RDEX command.

Next, the general register location specified by the GR1 field is addressed and the contents are read out into buffer 203-16. During the execution, the PI command formatted in register R2 is loaded into data out register 204-14. Additionally, under microprogram control, processor pair 200-0 loads signals from register 201-15 and PSR register 204-20 into bit positions 0-7 of steering register 204-16 (see FIG. 12). These signals provide the necessary steering information to SIU 100 for the transfer of the PI command to the SIU circuits or to the port (i.e., port L) to which SIU 100 connects. The sequence for transferring a PI write command is illustrated in FIGS. 10a and 10b.

The processor pair 200-0 forces the AOPR line to a binary ONE and delays execution of the next microinstruction until it receives a signal via ARA line indicating acceptance of the request by SIU 100. Assuming acceptance, SIU 100 forces the ARA line to a binary ONE. Simultaneously, SIU 100 forces the APC line to a binary ONE signalling the port L circuits to accept the command.

Referring to FIG. 4a, the APC line when a binary ONE conditions the circuits 103-20 to generate signal ACPTPICMD100 which loads the PI command word into register 103-25 via the PDFS lines. Upon detecting a change in state on the ARA line, processor pair 200-0 under microprogram control completes processing of the WREX instruction by transferring the data word formatted as shown in FIG. 8a from buffer 203-16 to data out register 204-14. The data word is loaded into register 103-24 via the PDFS lines in response to control signals from the circuits 103-20.

The circuits 103-20 upon decoding the bits of the PI command word force load signal LOADREG10 to a binary ONE. Additionally, decoder circuits not shown decode the register number field and force signal REG01120 to a binary. These signals cause AND gate 103-202 of FIG. 4b to force signal LDREG0110 to a binary ONE which results in loading interrupt control register 103-30 with the contents of register 103-24. This results in the interrupt control register 103-30 storing information having the format of FIG. 8a and values mentioned (i.e., interrupt level type 1 has the value 5 octal).

Next, the processor pair 200-0 is operative to establish the particular time interval and whether to set this type of interrupt. The value to be loaded into the preset register 103-400 of FIG. 4b is generally determined by considering the requirements of the user programs being run and establishing the minimum time out that any user program will require. In the present system, the time out value is defined as 100 milliseconds. This means that every time the SIU interval timer times out, it is automatically reloaded with the 100 millisecond value.

In view of the above, processor pair 200-0 is operative to execute another WREX instruction. This instruction generates a PI command specjfying the loading of preset register 103-400 with a value whose complement defines the desired 100 millisecond interval. It also generates a PI control command specifying the enabling of flip-flop 103–450 (i.e., bit 23 = 1). It will be assumed that the above command is generated in the manner previously described.

First, PI command causes the circuits 103-20 to force both load signal LOADREG10 and signal REG02120 to binary ONES. Again, the signal LOADREG10 results from the decoding of PI command word loaded into register 103-25. The signal REG02120 results from the decoding of the register number or address field of the PI command word.

The signals LOADREG10 and REG02120 condition AND gate 103–200 to force load register signal LDREG0210 to a binary ONE. This enables the preset register 103–400 to be loaded with the contents of register 103-24 in response to a clocking signal CLOCK010.

Additionally, the load register signal LDREG0210 together with signal PIBIT2310 cause AND gate 103–452 of FIG. 4c to switch enable flip-flop 103–450 to a binary ONE. This allows the generation of a type 1 interrupt when the internal interrupt flip-flop 103–436 is switched to a binary ONE by timer counter 103–402 as explained herein.

With reference to FIG. 4a, it is assumed that the module includes a common routine for updating the number of different values which have been loaded into the watchdog tables by individual user programs associated with the different modules of FIG. 1. The time out values in the watchdog timer tables are updated each time the module answers an SIU interval timer interrupt. This occurs each time the timer exhausts its count.

Referring to FIG. 4c, it will be noted that the most significant 12 bit positions of counter 103–402 are loaded automatically with the complement of the contents of preset register 103–400 each time, the counter 103–402 exhausts its count (i.e., when COUT = 1). That is, each time the counter 103–402 increments to all ONES (carry out condition), the most significant 12 bit positions are preset with the complement of the contents of preset register 103–400 in response to clocking signal CLOCK030. During the same clocking signal, the least significant 12 bit positions change from all ONES to all ZEROS and the counter 103–402 continues to be incremented.

It will be appreciated that although the counter is incrementing, its operation can be viewed by the system as decrementing (i.e., the most significant 12 bit positions are preset when the counter decrements to all ZEROS at which time the least significant 12 bit positions are all binary ONES).

When the COUT signal CARRY10 is a binary ONE signalling the completion of an interval, this causes rollover counter 103-436 to be switched to a binary ONE. This in turn causes NAND gate 103-458 to switch signal INTTYPE10 to a binary ZERO.

The signal INTTYPE10 is applied as an input to the internal interrupt logic circuits 103-28. The interrupt logic circuits 103-28 compare the priority level assigned to the type timer interrupt with the priority levels of the other types of interrupts which are present. By having assigned a low priority value to the timer interrupt, the processor pair 200-0 is able to complete the processing of more urgent events having higher priorities as previously discussed. The resulting interrupt request presented to processor pair 200-0 is formatted as shown in FIG. 11. In this case, the level number is set to a value of 5 while the interrupt type is coded as "001" (type 1).

Figure 9:
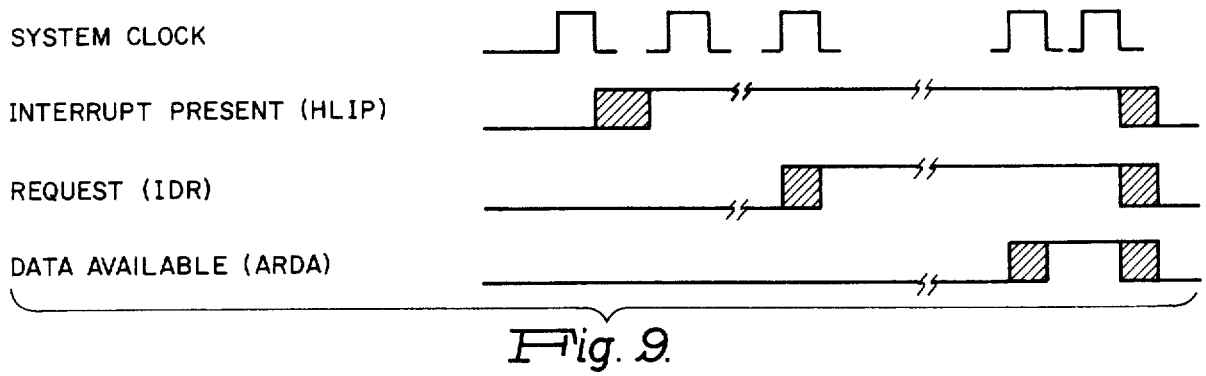
FIG. 9 illustrates the signal sequence for processing an interrupt.
Figure 10D:
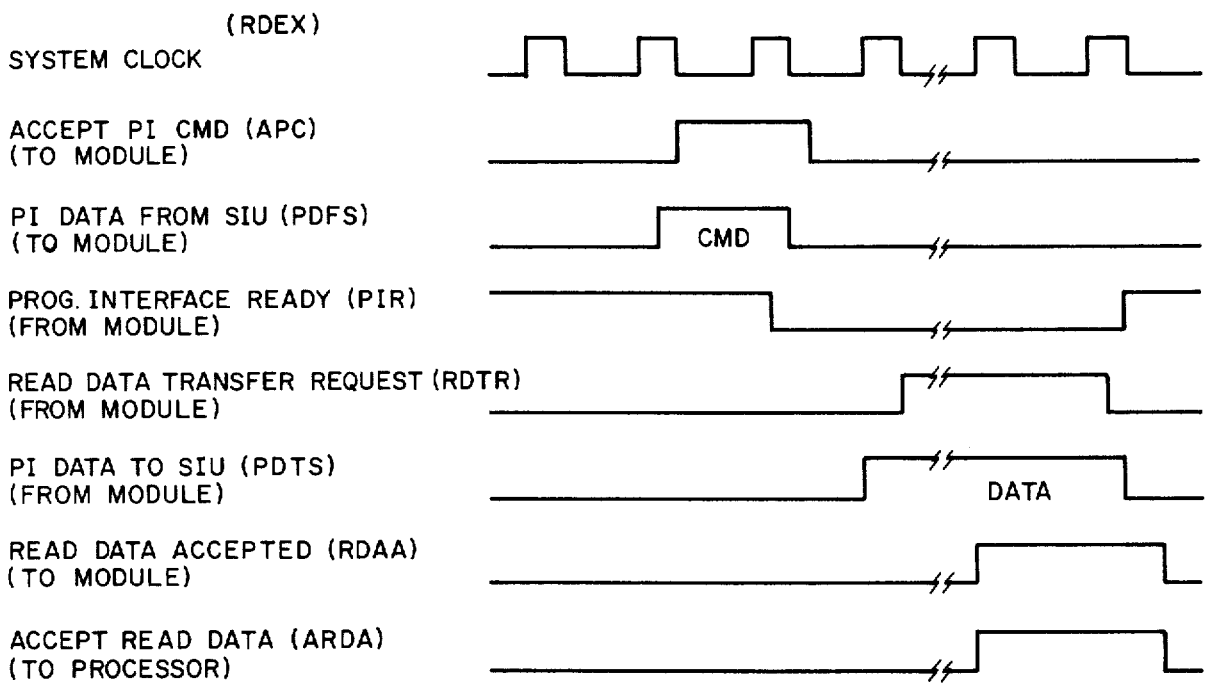

When the processor pair 200-0 finally answers the timer interrupt via the sequence of FIG. 9, it then executes a RDEX instruction. This causes processor pair 200-2 to generate a PI command formatted, as shown in FIG. 7a, which is coded to specify the reading of register 02 and the clearing thereof (i.e., bit 28 is a binary ONE). The RDEX instruction and PI read/clear command execution and generation is performed in the same manner as a WREX instruction and PI write command. The sequence for transferring a PI read command is illustrated in FIG. 10d.

The command word of the PI command is transferred via the PDFS lines and loaded into register 103-25 of FIG. 4a. The circuits 103-20 of FIG. 4a decode the command and are operative to force signals READ/CLR10 and RDREG0210 to binary ONES. As seen from FIG. 4c, this causes NAND/AND gate to force signal CLREG0210 and signal CLREG0200 respectively to a binary ONE and a binary ZERO.

Normally, signals CLREG0210 and CLREG0200 reset the rollover counter 103-424 and the interrupt request flip-flop 103-436 to binary ZEROS upon the occurrence of a next clock signal CLOCK030. However, if the read and clear command occur during the same clock signal as the generation of a carry out signal CARRY10, the interrupt request flip-flop 103-436 remains set and the rollover counter 103-424 is set to a value of "0001." This ensures that no intervals are lost.

FIG. 8c illustrates the format of the signals which are applied via switch 103-50 and to the circuits of section 102 of FIG. 3b. From there the timer information signals are applied via the circuits of section 101 to the DFS lines of the processor pair 200-0. As seen from FIG. 10d, processor pair 200-0 waits until it receives the requested timer information signals from the SIU 100 which is signalled by SIU 100 forcing signal ARDA to a binary ONE after having applied the timer information to the DFS lines.

Upon having received the timer information signals, the processor pair 200-0 is operative to execute the aforementioned common routine. The routine references the various time out values in each of the watchdog timer tables via appropriate ZAC memory commands to module 500. If the value is positive, the information, upon being transferred to processor pair 200-0 via output section 500-10, is decremented by the lapse time and tested. If any one of those values change from greater than zero to zero or less than zero, the routine puts an entry in as the event queue to give control to the user program to notify it that a time out has occurred.

It will be appreciated that the common routine updates the time accumulation in local memory 500 based upon the interval of the timer (preset value) and the rollover counter. If the interval is ONE, then the watchdog timer values are updated by the interval value. Where the interval is more than ONE, the processor pair 200-0 multiplies the number of intervals by the interval value and uses the product to update the watchdog timer values. Here, the concern is with the number of complete intervals.

It will be appreciated that the processor pair 200-0 is also able to direct other types of PI commands which enable the read out of the timer without clearing and which disable timer interrupts. These commands are generated in the same manner as described above.

For example, during test operations and system start up, the processor 200-0 can direct to SIU 100 a control command which as bit 23 set to a binary ZERO. The circuits 103-20, in response to the command, are operative to force signal LDREG0210 to a binary ONE. It is seen from FIG. 4c, that signals LDREG0210 and PI-BIT2300 condition gates 103-456 and 103-454 to switch enable flip-flop 103-450 from a binary ONE to a binary ZERO. Accordingly, this inhibits the generation of a type 1 interrupt request from being applied to the circuits 103-28 of FIG. 4a. It will be appreciated that notwithstanding the disabling of timer interrupts, the timer 103-40 continues its operation. With the rollover counter 103-404 up to 15 intervals may be counted out before the timer information accumulated can not be used to update values stored in memory.

From the above, it is seen that the system is required to expend minimum overhead processing time in controlling the operation of timer 103-40. The arrangement requires only a single command to disable and enable interrupt requests and to assign a desired low priority level.

As mentioned above, the timer 103-40 values may also be read by processor 200-0 at times other than in response to an interrupt request. In this case, the read command formatted as shown in FIG. 7a would have bit 28 set to a binary ZERO. This would prevent the clearing of rollover counter 103-404 of FIG. 4c (i.e., signal READCLR10 = 0). This enables the processor pair 200-0 to calculate parts of intervals for establishing the precise time at which a particular system event occurred or for calculating the time of day.

In addition to the storage of watchdog timer values, a table includes a time of day value. When the processor pair 200-0 receives a request for the time of day, it first generates a ZAC memory command to determine the number of intervals stored in the interval timer entry. Next, it generates a read command to SIU 100 for reading the contents of register 2. This provides both subinterval information stored in counter 103-402 and interval information stored in rollover counter 103-404. The contents of rollover counter 103-404 indicate the presence of a timer interrupt request.

Normally, the processor pair 200-0 takes the timer counter increment value (delta) and adds that to the value read out from memory 500. If the rollover count was not zero, then the interval value multiplied by the rollover count is also added to the previous sum. However, it does not update the memory value since this would introduce inaccuracies. Instead, the sum is transferred to the requesting user program.

The above illustrates a preferred embodiment of the present invention which provides a variety of timing functions in conjunction with an input/output processing system. The arrangement reduces to a minimum the overhead processing normally required for the performance of such timing functions.

Moreover, the arrangement of the present invention enables the performance of timing operations to take place at a lower priority without loss in timer accuracy. This permits the system to more easily manage the processing of events on a priority interrupt level basis. Further, the arrangement provides for the alteration of the priority levels assigned to timer originated interrupts. This allows the system greater flexibility in managing of its resources within the constraints mentioned.

Additionally, the arrangement of the present invention requires a minimum amount of control and supervision. For example, timing operations may be enabled or disabled in response to a single command. The timer may be read and cleared in response to a single command.

It will be obvious to those skilled in the art that many changes can be made to the illustrated embodiment without departing from the scope of the present invention. For example, any conventional type of counter network, size rollover counter and command formats may be used in accordance with the teachings of the present invention. Moreover, while the preferred embodiment included the timer within the system interface unit to avoid duplication, it will be appreciated that the timer could also have been included within other modules associated with other ports addressable by commands.

To prevent undue burdening of the description within the ken of those skilled in the art, a block diagram approach has been followed, with a detailed functional description of each block and specific identification of the circuits it represents. The individual engineer is free to select elements and components such as flip-flop circuits, registers, etc. from his own background or from available standard references such as Computer Design Fundamentals, by Chu (McGraw-Hill Book Company, Inc.) and Pulse, Digital and Switching Waveforms by Millman and Taub, (McGraw-Hill Book Company, Inc.).

While in accordance with the provisions and statutes there has been illustrated and described the best form of the invention known, certain changes may be made to the system described without departing from the spirit of the invention as set forth in the appended claims and that in some cases, certain features of the invention may be used to advantage without a corresponding use of other features.

What is claimed is:

1. An input/output processing system for controlling input/output operations during the execution of a plurality of processes, said system including a plurality of modules including at least one input/output processing unit and priority network means connected to said input/output processing unit for processing different types of interrupt requests from different ones of said plurality of modules, said system further including timer apparatus comprising:

register means coupled to said priority network means, said register means storing a number of groups of coded level signals designating priorities assigned to a corresponding number of predetermined types of said interrupt requests, a predetermined one of said number of groups being coded to specify a priority which is low as compared to the priorities of other types of requests;

preset register means coupled to said processing unit for receiving signals corresponding to a count defining a time interval;

an interval counter connected to said preset register means for receiving said count, said interval counter in response to clocking signals generating an output signal indicating each completion of said timer interval;

a rollover counter connected to said interval counter, said rollover counter in response to said output signal storing a count indicating the total number of completed intervals counted by said interval counter; and, interrupt request means connected to said interval counter, said interrupt request means in response to each said output signal generating a predetermined type of interrupt request having said low priority, each said request output signal conditioning said interval counter to receive said count from said preset register for counting another time interval and conditioning said rollover counter to advance said count by one enabling said processing unit to expend a minimum of processing time in processing timer requests.

2. The system of claim 1 wherein said system further includes:

command register means being connected to receive commands from said processing unit;

command decode circuit means coupled to said command register means, said decode circuit means in response to an initial command from said processing unit being operative to generate signals for loading said preset register means with said count specified by said initial command; and, said processing unit being operative upon processing said interrupt request from said timing apparatus to apply a first type of command to said command register means, said decode circuit means being operative in response to said first type of command to generate signals to clear said rollover counter to a binary ZERO state only when said interval counter is not in the process of completing the counting of another time interval.

3. The system of claim 2 wherein said interrupt request circuit means includes:

enable bistable means having set and reset input gating means, said set and reset input gating means each being connected to said command register means and to said command decode circuit means;

interrupt bistable means having set and reset input gating means, said set gating means being connected to said interval counter for receiving said output signal and said reset gating means being connected to said interval counter and to said command decode circuit means; and output gating means connected to said enable and interrupt bistable means, said output gating means, said enable and interrupt bistable means when both set to a binary ONE state conditioning said output gating means to generate said predetermined type of interrupt request.

4. The system of claim 3 wherein said processing unit is operative to generate a control type command coded to specify switching said enable bistable means to said binary ONE state for permitting the generation of interrupt requests by said timer apparatus.

5. The system of claim 3 wherein said timer apparatus further includes gating means connected to said command decode means, said gating means being operative in response to said first type of command to generate an output clear control signal, said rollover counter in response to said control signal switching to said binary ZERO state in the absence of said output signal from said interval counter and said reset gating means of said interrupt bistable means switching said interrupt bistable means to a binary ZERO state in the absence of said output signal indicating that said interval counter has not completed the counting of another time interval.

6. The system of claim 5 wherein said timer apparatus further includes:
output switching means coupled to said processing unit, said command decode means, said enable bistable means, said preset register means, said interval counter and said rollover counter, said output switching means being conditioned by said first type command to transfer signals representative of the states of each of said means, said interval and rollover counters to said processing unit.

7. The system of claim 6 wherein said first type of command includes a group of bits coded to specify the readout of said timer register means to said processing unit and a predetermined bit, said bit when in a binary ONE state conditioning said gating means to generate said output clear control signal and said bit when in a binary ZERO state inhibiting said gating means from generating said output clear control signal.

8. The system of claim 6 wherein said processing unit includes a microprogrammed control unit storing sequences of microinstruction words for generating control signals for directing the operation of said processing unit, said sequences including microinstructions coded for generating said first type of command.

9. The system of claim 8 wherein said system further includes:
a memory module having a plurality of storage locations, a first group of said plurality of storage locations being coded to store instructions of a timer routine and other groups of said plurality of said storage locations for storing time out values in a plurality of timer tables corresponding in number to said plurality of modules;
means coupling said memory module to said processing unit; and,
said microprogrammed control unit sequences further including microinstructions for accessing said instructions of said timer routine and said processing unit being conditioned by said instructions to update said time out values in said plurality of said tables in response to each timer apparatus interrupt request.

10. The system of claim 8 wherein said sequences include microinstructions for generating a second type of command to said command register means, said second type of command being coded to specify the loading of said register means with a different value for said predetermined one of said groups and said command decode means being operative in response to said second type of command to generate control signals for storing said different value in said register means enabling said processing unit to alter the manner in which it is to process said timer interrupt requests.

11. The system of claim 1 wherein said interval counter includes a first number of bistable devices and an output terminal for applying said output signal and said preset register means including a second number of bistable devices each having a pair of output terminals and means connecting a predetermined output terminal of each said pair as an input to a different one of a group of said first number of bistable devices, said group including a load input terminal connected to receive said output signal from said output terminal and said group being conditioned by said output signal to be loaded automatically with signals from said predetermined output terminals of said second number of bistable devices.

12. The system of claim 11 wherein said group of said first number of bistable devices corresponds to only the most significant bit positions of said interval counter and wherein said predetermined output terminal devices correspond to the binary ZERO sides second number of bistable devices resulting in the loading of said interval counter with the complement of said count stored in said preset register means.

13. The system of claim 12 wherein said second number corresponds to at least one half of said first number.

14. A data processing system including a plurality of modules, said plurality of modules including at least one input/output processing unit and a system interface unit having a plurality of ports and priority network means for processing different types of interrupt requests from said modules, said system further including timing apparatus comprising:
command register means and command decode circuit means, included in said system interface unit, said command register means being connected to receive commands from said number of transfer networks, said command decode circuit means connected to said command register means and operative to generate control signals in response to said commands;
register means coupled to said priority network means, said register means storing a number of groups of coded level signals designating priorities assigned to a corresponding number of predetermined types of said interrupt requests, a predetermined one of said number of groups being coded to specify a priority which is low as compared to the priorities of other types of requests;
present register means coupled to said processing unit for receiving signals corresponding to a count defining a timer interval;
interval counter means connected to said preset register means for receiving said count, said interval counter means in response to clocking signals generating an output signal indicating each completion of said timer interval;
rollover counter means connected to said interval counter, said rollover counter means in response to said output signal storing a count indicating the total number of completed intervals counted by said interval counter means; and,
interrupt request means connected to said interval counter means, said interrupt request means in response to each said output signal generating a predetermined type of interrupt request having said low priority, each said request output signal conditioning said interval counter means to receive said count from said preset register means for counting another time interval and conditioning said rollover counter means to advance said count by one enabling said processing unit to expend a minimum of processing time in processing timer requests.

15. The system of claim 14 wherein said processing unit includes a microprogrammed control unit storing sequences of microinstruction words for generating control signals for directing the operation of said processing unit, said sequences including microinstructions coded for generating a first type of command to said command register means in response to said interrupt request from said timing apparatus, said command decode circuit means being operative in response to said first type of command to generate signals to clear said rollover counter means to a binary ZERO state only when said interval counter means is not in the process of completing the counting of another timer interval.

16. The system of claim 15 wherein said system further includes:
   a memory module having a plurality of storage locations, a first group of said plurality of storage locations being coded to store instructions of a timer routine and other groups of said plurality of said storage locations for storing time out values in a plurality of timer tables corresponding in number to said plurality of modules;
   means coupling said memory module to said processing unit; and,
   said microprogrammed control unit sequences further including microinstructions for accessing said instructions of said timer routine and said processing unit being conditioned by said instructions to update said time out values in said plurality of said tables in response to each timer apparatus interrupt request.

17. The system of claim 14 wherein said interrupt request circuit means includes:
   enable bistable means having set and reset input gating means, said set and reset input gating means each being connected to said command register means and to said command decode circuit means,
   interrupt bistable means having set and reset input gating means, said set gating means being connected to said interval counter for receiving said output signal and said reset gating means being connected to said interval counter and to said command decode circuit means; and
   output gating means connected to said enable and interrupt bistable means, said output gating means, said enable and interrupt bistable means when both set to a binary ONE state conditioning said output gating means to generate said predetermined type of interrupt request.

18. The system of claim 17 wherein said processing unit is operative to generate a control type command coded to specify switching said enable bistable means to said binary ONE state for permitting the generation of interrupt requests by said timer apparatus.

19. The system of claim 17 wherein said timer apparatus further includes gating means connected to said command decode means, said gating means being operative in response to said first type of command to generate an output clear control signal, said rollover counter means in response to said control signal switching to said binary ZERO state in the absence of said output signal from said interval counter means and said reset gating means of said interrupt bistable means switching said interrupt bistable means to a binary ZERO state in the absence of said output signal indicating that said interval counter means has not completed the counting of another time interval.

20. The system of claim 19 wherein said timer apparatus further includes:
   output switching means coupled to said processing unit, said command decode means, said enable bistable means, said preset register means, said interval counter means and said rollover counter means, said output switching means being conditioned by said first type command to apply to one of said number of transfer network signals representative of the states of each of said means for transfer to said processing unit.

21. The system of claim 20 wherein said first type of command includes a group of bits coded to specify the readout of said timer register means to said processing unit and a predetermined bit, said bit when in a binary ONE state conditioning said gating means to generate said output clear control signal and said bit when in a binary ZERO state inhibiting said gating means from generating said output clear control signal.

22. The system of claim 14 wherein said interval counter means includes a first number of bistable devices and an output terminal for applying said output signal and said preset register means including a second number of bistable devices each having a pair of output terminals and means connecting a predetermined output terminal of each said pair as an input to a different one of a group of said first number of bistable devices, said group including a load input terminal connected to receive said output signal from said output terminal and said group being conditioned by said output signal to be loaded automatically with signals from said predetermined output terminals of said second number of bistable devices.

23. An input/output data processing system including:
   a plurality of modules, said plurality of modules including at least one input/output processing unit;
   a memory module having a plurality of storage locations for storing in a plurality of tables time out information required for program processing; and,
   a system interface unit including a plurality of ports and priority network means for processing different types of interrupt requests from said modules, said system interface unit further including timer apparatus comprising:
      register means coupled to said priority network means, said register means storing a number of groups of coded level signals designating priorities assigned to a corresponding number of predetermined types of said interrupt requests, a predetermined one of said number of groups being coded to specify a priority which is low as compared to the priorities of other types of requests;
      preset register means coupled to said processing unit for receiving signals corresponding to a count defining a time interval;
      first counter means connected to said preset register means for receiving said count, said first counter in response to clocking signals generating a request output signal indicating each completion of said time interval;
      second counter means connected to said first counter means, said second counter means in response to said output signal storing a count indicating the total number of completed intervals counted by said first counter means; and, interrupt request means connected to said first counter means, said interrupt request means in response to each said output signal generating a predetermined type of interrupt request having said low priority for signaling said processing unit to update said time out information, each said output signal conditioning said first counter means to receive said count from said preset register for counting another time interval and conditioning said second counter means to advance said count by one enabling said processing unit to expend a minimum of processing time in processing timer requests.

24. The system of claim 23 wherein said system further includes:

command register means being connected to receive commands from said processing unit;

command decode circuit means coupled to said command register means, said decode circuit means in response to an initial command from said processing unit being operative to generate signals for loading said preset register means with said count specified by said initial command; and, said processing unit being operative upon processing said interrupt request from said timing apparatus to apply a first type of command to said register means, said decode circuit means being operative in response to said first type of command to generate signals to clear said second counter means to a binary ZERO state only when said first counter means is not in the process of completing the counting of another time interval.

25. The system of claim 24 wherein said processing unit includes a microprogrammed control unit storing sequences of microinstruction words for generating control signals for directing the operation of said processing unit, said sequences including microinstructions coded for generating said first type of command.

26. The system of claim 25 wherein a first group of said plurality of storage locations of said memory module are coded to store instructions of a timer routine and other groups of said plurality of said storage locations for storing time out values in said plurality of tables corresponding in number to said plurality of modules;

means coupling said memory module to said processing unit; and, said microprogrammed control unit sequences further including microinstructions for accessing said instructions of said timer routine and said processing unit being conditioned by said instructions to update said time out values in said plurality of said tables in response to each timer apparatus interrupt request.

27. The system of claim 26 wherein said sequences include microinstructions for generating a second type of command to said command register means, said second type of command being coded to specify the loading of said register means with a different value for said predetermined one of said groups and said command decode means being operative in response to said second type of command to generate control signals for storing said different value in said register means enabling said processing unit to alter the manner in which it is to process said timer interrupt requests.

28. The system of claim 24 wherein said timer apparatus further includes gating means connected to said command decode means, said gating means being operative in response to said first type of command to generate an output clear control signal, said second counter means in response to said control signal switching to said binary ZERO state in the absence of said output signal from said first counter means and said reset gating means of said interrupt bistable means switching said interrupt bistable means to a binary ZERO state in the absence of said output signal indicating that said first counter means has not completed the counting of another time interval.

29. The system of claim 28 wherein said timer apparatus further includes:

output switching means coupled to said processing unit, said command decode means, said preset register means, said first counter means and said second counter means, said output switching means being conditioned by said first type command to transfer signals representative of the states of each of said means to said processing unit.

30. The system of claim 29 wherein said first type of command includes a group of bits coded to specify the readout of said timer register means to said processing unit and a predetermined bit, said bit when in a binary ONE state conditioning said gating means to generate said output clear control signal and said bit when in a binary ZERO state inhibiting said gating means from generating said output clear control signal.

31. The system of claim 23 wherein said first counter means includes a first number of bistable devices and an output terminal for applying said output signal and said preset register means including a second number of bistable devices each having a pair of output terminals and means connecting a predetermined output terminal of each said pair as an input to a different one of a group of said first number of bistable devices, said group including a load input terminal connected to receive said output signal from said output terminal and said group being conditioned by said output signal to be loaded automatically with signals from said predetermined output terminals of said second number of bistable devices.

* * * * *